US012574420B2

(12) United States Patent
Deshpande et al.

(10) Patent No.: US 12,574,420 B2
(45) Date of Patent: Mar. 10, 2026

(54) DYNAMIC POLICY AND NETWORK SECURITY ZONE GENERATION

(71) Applicant: OKTA, INC., San Francisco, CA (US)

(72) Inventors: Apoorva Deshpande, Milpitas, CA (US); Gunes Kayacik, Bainbridge Island, WA (US); Karthik Bhat, Saratoga, CA (US); RaghuRam Pamidimarri, Union City, CA (US)

( * ) Notice: Subject to any disclaimer, the term of this patent is extended or adjusted under 35 U.S.C. 154(b) by 127 days.

(21) Appl. No.: 18/651,208

(22) Filed: Apr. 30, 2024

(65) Prior Publication Data

US 2025/0337787 A1     Oct. 30, 2025

(51) Int. Cl.
H04L 29/06 (2006.01)
H04L 9/40 (2022.01)

(52) U.S. Cl.
CPC .................................... H04L 63/20 (2013.01)

(58) Field of Classification Search
CPC ...................................................... H04L 63/20
See application file for complete search history.

(56) References Cited

U.S. PATENT DOCUMENTS

| | | | | |
|---|---|---|---|---|
| 11,102,204 B1* | 8/2021 | Jacques de Kadt | .. | H04L 9/0825 |
| 11,768,699 B2* | 9/2023 | Esibov | .................. | G06F 21/564 |
| | | | | 718/104 |
| 2023/0148158 A1* | 5/2023 | Bandarupalli | ...... | H04L 67/1008 |
| | | | | 709/224 |
| 2024/0348657 A1* | 10/2024 | Tembey | .................. | H04L 63/20 |

* cited by examiner

*Primary Examiner* — Noura Zoubair
(74) *Attorney, Agent, or Firm* — Holland & Hart LLP

(57) ABSTRACT

An authentication server of an identity management system may establish an authentication policy for a tenant of a multi-tenant system and receive device access signals from one or more network identifiers. In some examples, the authentication server may receive an indication from machine learning (ML) models to update the authentication policy of a tenant based on a set of authentication rules of one or more second tenants that are for one or more applications common between the tenant and the one or more second tenants. In some other examples, the ML model may monitor a set of device access signals received at the authentication server to obtain a set of assurance scores for associated network identifiers. The authentication server may then update the authentication policy for a tenant, generate a set of network zones, or both based on the ML model outputs.

19 Claims, 13 Drawing Sheets

Figure 12:
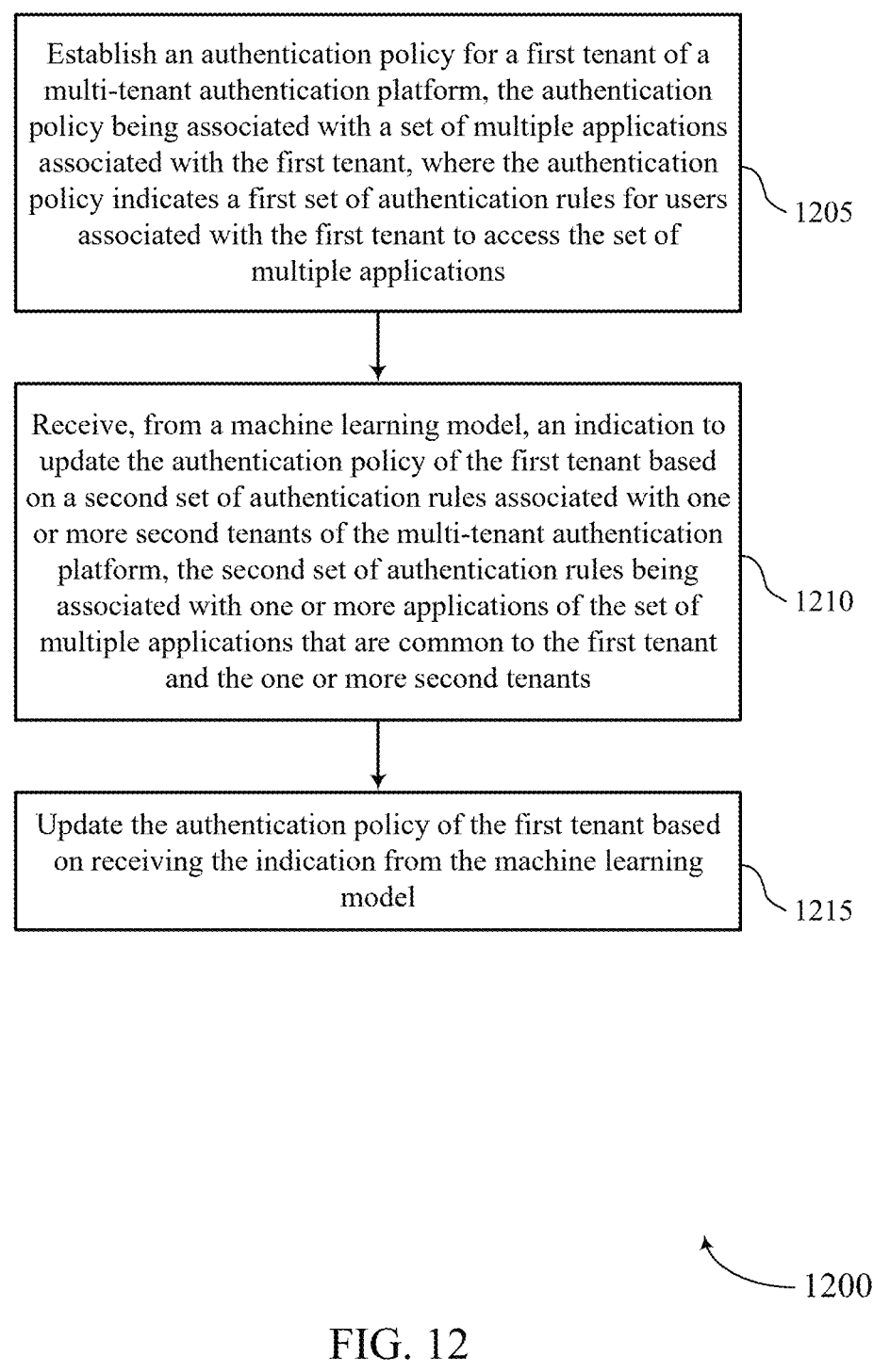

Establish an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications

1205

Receive, from a machine learning model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants

1210

Update the authentication policy of the first tenant based on receiving the indication from the machine learning model

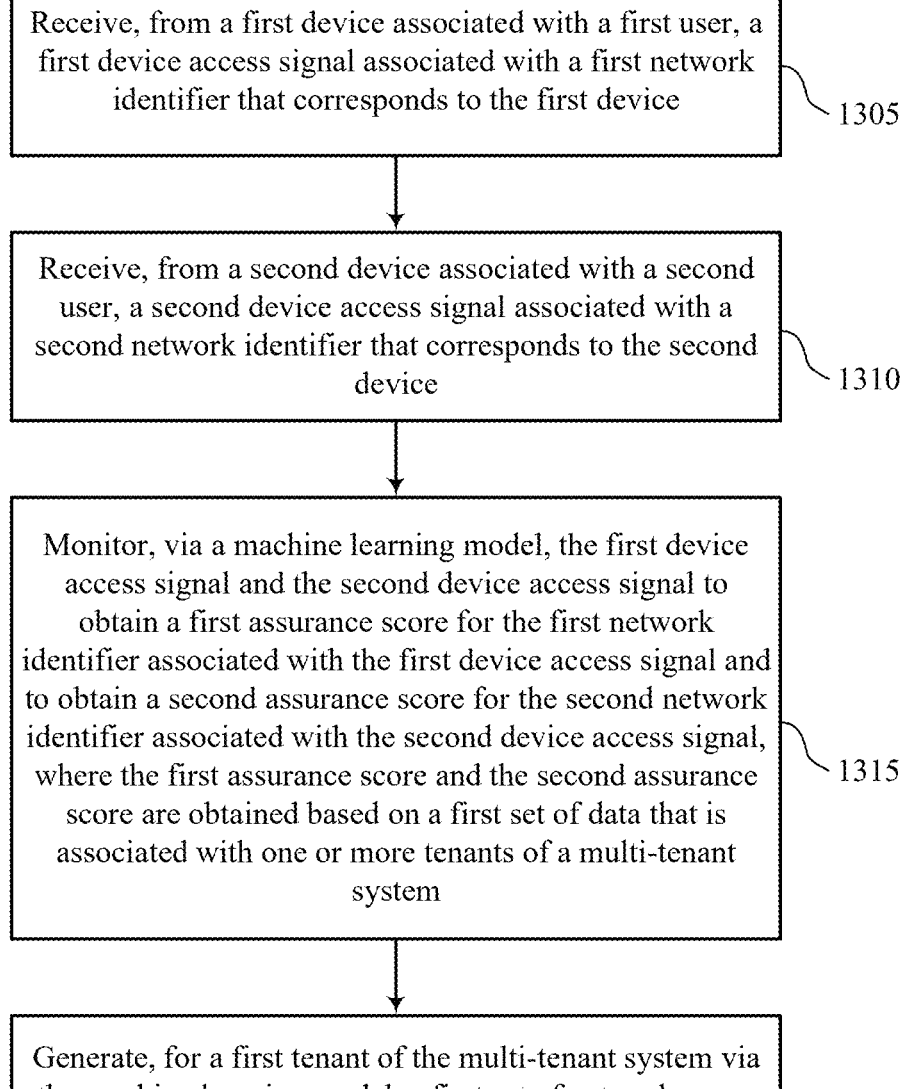

Receive, from a first device associated with a first user, a first device access signal associated with a first network identifier that corresponds to the first device ⌐ 1305

Receive, from a second device associated with a second user, a second device access signal associated with a second network identifier that corresponds to the second device ⌐ 1310

Monitor, via a machine learning model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system ⌐ 1315

Generate, for a first tenant of the multi-tenant system via the machine learning model, a first set of network zones including the first network identifier and the second network identifier based on the first assurance score associated with the first network identifier and the second assurance score associated with the second network identifier each satisfying a first threshold ⌐ 1320

DYNAMIC POLICY AND NETWORK SECURITY ZONE GENERATION

FIELD OF TECHNOLOGY

The present disclosure relates generally to identity management, and more specifically to dynamic policy and network security zone generation.

BACKGROUND

An identity management system may be employed to manage and store various forms of user data, including usernames, passwords, email addresses, permissions, roles, group memberships, etc. The identity management system may provide authentication services for applications, devices, users, and the like. The identity management system may enable organizations to manage and control access to resources, for example, by serving as a central repository that integrates with various identity sources. The identity management system may provide an interface that enables users to access a multitude of applications with a single set of credentials.

In some examples of the identity management system, users (e.g., administrators) may establish authentication policies to control a set of authentication rules for users accessing one or more applications. In some other examples of the identity management system, users may establish one or more network zones that can be used to provide authentication to one or more users accessing applications, services, networks, and the like. However, users may establish the authentication policies and network zones manually which may be relatively inefficient and time consuming.

SUMMARY

A method for authentication policy management by an apparatus is described. The method may include establishing an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications, receiving, from a machine learning (ML) model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants, and updating the authentication policy of the first tenant based on receiving the indication from the ML model.

An apparatus for authentication policy management is described. The apparatus may include one or more memories storing processor executable code, and one or more processors coupled with the one or more memories. The one or more processors may individually or collectively be operable to execute the code to cause the apparatus to establish an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications, receive, from a ML model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants, and update the authentication policy of the first tenant based on receiving the indication from the ML model.

Another apparatus for authentication policy management is described. The apparatus may include means for establishing an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications, means for receiving, from a ML model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants, and means for updating the authentication policy of the first tenant based on receiving the indication from the ML model.

A non-transitory computer-readable medium storing code for authentication policy management is described. The code may include instructions executable by one or more processors to establish an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications, receive, from a ML model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants, and update the authentication policy of the first tenant based on receiving the indication from the ML model.

Some examples of the method, apparatus, and non-transitory computer-readable medium described herein may further include operations, features, means, or instructions for receiving, via one or more user inputs for a first user associated with the first tenant, an indication of one or more authentication rules associated with access to the one or more applications of the set of multiple applications, the first set of authentication rules including the one or more authentication rules, where establishing the authentication policy for the first tenant may be based on receiving the one or more user inputs.

In some examples of the method, apparatus, and non-transitory computer-readable medium described herein, establishing the authentication policy for the first tenant may include operations, features, means, or instructions for generating, via the ML model, the first set of authentication rules for the authentication policy of the first tenant based on one or more authentication rules used by the one or more second tenants of the multi-tenant authentication platform that may be associated with accessing the one or more applications of the set of multiple applications, where the first set of authentication rules may be generated via the ML model in accordance with a privacy preservation scheme.

Some examples of the method, apparatus, and non-transitory computer-readable medium described herein may further include operations, features, means, or instructions for training the ML model using a first set of data associated with a type of application for each application of the one or more applications, a second set of data associated with user metadata of one or more sets of users of each tenant of the multi-tenant authentication platform, a third set of data associated with a set of user device data of one or more user devices being used by the one or more sets of users, a fourth set of data associated with network conditions of an access request, or any combination thereof.

In some examples of the method, apparatus, and non-transitory computer-readable medium described herein, the type of application for a respective application indicated by the first set of data may be based on the respective application being associated with sensitive data of a respective tenant.

Some examples of the method, apparatus, and non-transitory computer-readable medium described herein may further include operations, features, means, or instructions for receiving, from a user of the first tenant, an indication of an additional application to be accessed by the users associated with the first tenant, where the indication to update the authentication policy of the first tenant may be received from the ML model based on the user of the first tenant adding the additional application to the set of multiple applications being accessed by the users of the first tenant, a first set of attributes associated with the user of the first tenant, a second set of attributes associated with a device used by the first user to access the additional application, or any combination thereof, and where the second set of authentication rules associated with the one or more second tenants may be associated with the additional application, a third set of attributes associated with a set of users of the one or more second tenants, a fourth set of attributes associated with a set of devices used by the set of users to access the additional application, or any combination thereof.

In some examples of the method, apparatus, and non-transitory computer-readable medium described herein, receiving the indication from the ML model may include operations, features, means, or instructions for receiving, from the ML model, an indication that the second set of authentication rules satisfy a first threshold for accessing the one or more applications, the first threshold being based on a first quantity of successful access requests and a second quantity of unsuccessful access requests.

Some examples of the method, apparatus, and non-transitory computer-readable medium described herein may further include operations, features, means, or instructions for receiving, from one or more users associated with one or more respective tenants, one or more access request messages to access a respective application, the one or more access request messages including data associated with the one or more users and transmitting, to the one or more users, a second indication to indicate a successful access request or an unsuccessful access request based on the data associated with the one or more users of the one or more access request messages, where the data associated with the one or more users indicates an affiliation of a user with a respective tenant and the first threshold for a respective authentication rule may be satisfied based on the first quantity of successful access requests that may be associated with an unaffiliated user satisfying a second threshold and the second quantity of unsuccessful access requests that may be associated with an unaffiliated user satisfying a third threshold.

Some examples of the method, apparatus, and non-transitory computer-readable medium described herein may further include operations, features, means, or instructions for receiving, from one or more users associated with each tenant, one or more access request messages including a first set of attributes associated with the one or more users and a second set of attributes associated with one or more devices used by the one or more users and inputting the one or more access request messages into the ML model, where the indication from the ML model may be based on the one or more access request messages that may be input into the ML model.

Some examples of the method, apparatus, and non-transitory computer-readable medium described herein may further include operations, features, means, or instructions for updating the authentication policy of the first tenant may be automatically triggered based on receiving the indication from the ML model.

A method for network zone management by an apparatus is described. The method may include receiving, from a first device associated with a first user, a first device access signal associated with a first network identifier that corresponds to the first device, receiving, from a second device associated with a second user, a second device access signal associated with a second network identifier that corresponds to the second device, monitoring, via a ML model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system, and generating, for a first tenant of the multi-tenant system via the ML model, a first set of network zones including the first network identifier and the second network identifier based on the first assurance score associated with the first network identifier and the second assurance score associated with the second network identifier each satisfying a first threshold.

An apparatus for network zone management is described. The apparatus may include one or more memories storing processor executable code, and one or more processors coupled with the one or more memories. The one or more processors may individually or collectively be operable to execute the code to cause the apparatus to receive, from a first device associated with a first user, a first device access signal associated with a first network identifier that corresponds to the first device, receive, from a second device associated with a second user, a second device access signal associated with a second network identifier that corresponds to the second device, monitor, via a ML model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system, and generate, for a first tenant of the multi-tenant system via the ML model, a first set of network zones including the first network identifier and the second network identifier based on the first assurance score associated with the first network identifier and the second assurance score associated with the second network identifier each satisfying a first threshold.

Another apparatus for network zone management is described. The apparatus may include means for receiving, from a first device associated with a first user, a first device access signal associated with a first network identifier that corresponds to the first device, means for receiving, from a second device associated with a second user, a second device access signal associated with a second network identifier that corresponds to the second device, means for monitoring, via a ML model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system, and means for generating, for a first tenant of the multi-tenant system via the ML model, a first set of network zones including the first network identifier and the second network identifier based on the first assurance score associated with the first network identifier and the second assurance score associated with the second network identifier each satisfying a first threshold.

A non-transitory computer-readable medium storing code for network zone management is described. The code may include instructions executable by one or more processors to receive, from a first device associated with a first user, a first device access signal associated with a first network identifier that corresponds to the first device, receive, from a second device associated with a second user, a second device access signal associated with a second network identifier that corresponds to the second device, monitor, via a ML model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system, and generate, for a first tenant of the multi-tenant system via the ML model, a first set of network zones including the first network identifier and the second network identifier based on the first assurance score associated with the first network identifier and the second assurance score associated with the second network identifier each satisfying a first threshold.

Some examples of the method, apparatus, and non-transitory computer-readable medium described herein may further include operations, features, means, or instructions for receiving, via one or more user inputs, an indication of a second set of network zones prior to receiving the first device access signal and the second device access signal, where the second set of network zones may be updated based on monitoring the first device access signal and the second device access signal.

Some examples of the method, apparatus, and non-transitory computer-readable medium described herein may further include operations, features, means, or instructions for storing, at a multi-tenant database of the multi-tenant system, a second set of data including the first network identifier, the first assurance score associated with the first network identifier, the second network identifier, the second assurance score associated with the second network identifier, or any combination thereof, the multi-tenant database including the first set of data associated with the one or more tenants of the multi-tenant system, where the first set of network zones may be generated based on storing the second set of data within the multi-tenant database, where storing data in the multi-tenant database of the multi-tenant system includes updating data within the multi-tenant database.

Some examples of the method, apparatus, and non-transitory computer-readable medium described herein may further include operations, features, means, or instructions for transmitting, to a third user associated with a tenant of the multi-tenant system, an indication of the first set of network zones generated and a recommendation to establish the first set of network zones and receiving, via a user input from the third user, an indication to establish the first set of network zones or an indication to refuse establishing the first set of network zones, the indication being based on the recommendation being transmitted to the third user.

In some examples of the method, apparatus, and non-transitory computer-readable medium described herein, the first device access signal includes data associated with the first device and the first user, and the second device access signal includes data associated with the second device and the second user, and monitoring the first device access signal and the second device access signal may include operations, features, means, or instructions for monitoring, via the ML model, the data of a respective device access signal to obtain a respective assurance score for a respective network identifier associated the respective device access signal.

In some examples of the method, apparatus, and non-transitory computer-readable medium described herein, the first device access signal, the second device access signal, or both may be associated with a phishing-resistant platform, data that may be associated with a respective tenant of the multi-tenant system, a network identifier that may be associated with the respective tenant, a respective device that may be managed by the respective tenant, or any combination thereof.

In some examples of the method, apparatus, and non-transitory computer-readable medium described herein, a respective network identifier of a respective device access signal includes an internet protocol address, a geographical location, or both.

In some examples of the method, apparatus, and non-transitory computer-readable medium described herein, a respective network zone of the first set of network zones provides one or more users access or restricts one or more users access to a network associated with a tenant, one or more applications associated with the tenant, or a combination thereof while the one or more users may be within the respective network zone.

In some examples of the method, apparatus, and non-transitory computer-readable medium described herein, the first device access signal indicates a first set of data associated with the first device and the first user and the second device access signal indicates a second set of data associated with the second device and the second user.

BRIEF DESCRIPTION OF THE DRAWINGS

FIGS. 12 and 13 show flowcharts illustrating methods that support dynamic policy and network security zone generation in accordance with aspects of the present disclosure.

DETAILED DESCRIPTION

Figure 1:
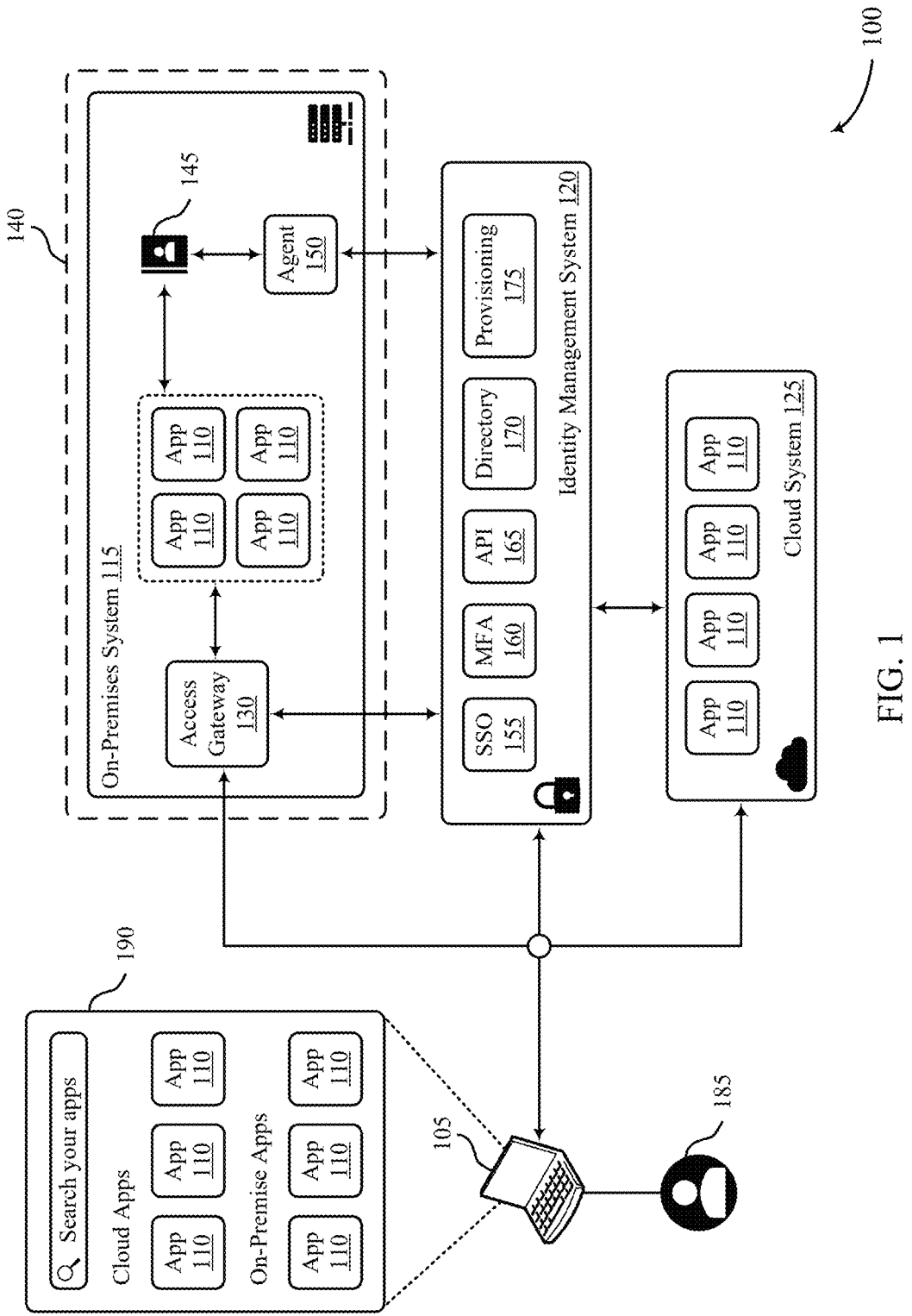
FIGS. 1 and 2 illustrate examples of a computing system that supports dynamic policy and network security zone generation in accordance with aspects of the present disclosure.

To ensure robust security for users accessing one or more applications, services, or networks, organizations, administrative users of organizations, or both may establish one or more authentication procedures. For example, an administrator may establish one or more authentication policies that include a set of authentication rules for users to follow when accessing one or more applications or services. In some cases, the authentication rules may be based on a type of data (e.g., public data, private data, confidential data, and the like) stored in or accessible by a respective application or service. Further, the administrator may establish authentication policies for types of users (e.g., marketing user, developer, administrator, and the like) of an organization. For example, an authentication rule may indicate that an authentication server may expect a user to perform a respective authentication technique or procedure (e.g., entering a password, dual factor authentication, and the like) to access the data of a first application.

In another example, an administrative user may establish one or more network zones where users can access applications, services, networks, or any combination thereof that are associated with an organization. For example, the administrative user may establish a set of network identifiers (e.g., internet protocol (IP) addresses, geographical locations, or both) where users may be able to or unable to access the applications, services, and networks associated with the organization. For example, a first set of IP addresses or a first set of geographical location coordinates associated with an office of an organization may be used to generate a first network zone where users of the organization can access applications, services, and networks associated with the organization.

Moreover, a second set of IP addresses or a second set of geographical location coordinates associated with a location that is unaffiliated with the organization, the users of the organization, or both, may be used to generate a second network zone where access to the applications, services, and networks associated with the organization are denied (e.g., users may be denied access within the network zone). However, an administrator may have to manually generate the authentication policies and the network zones, which may be relatively inefficient and time consuming. For example, an administrative user may have to manually input the one or more authentication rules for each authentication policy and manually input each network identifier to be included in a respective network zone. Moreover, such inputs may be based on the administrative user manually observing and monitoring data which may be relatively time consuming, unreliable, and inefficient.

To provide robust security for an organization, the techniques of the present disclosure may describe an organization utilizing one or more machine learning (ML) models to create and adjust authentication policies and to automatically establish and update network zones. In some examples, the organization may be a first tenant of a multi-tenant authentication platform that is associated with an authentication server and the authentication server may establish an authentication policy for the first tenant with a set of authentication rules associated with users accessing a set of applications associated with the first tenant.

Further, the authentication server may receive an indication from a ML model to update the authentication policy of the first tenant based on a second set of authentication rules associated with one or more second tenants of the multi-tenant authentication platform. Moreover, the second set of authentication rules may be associated with one or more applications that are common to the first tenant and the one or more second tenants. Therefore, the authentication server may update the authentication policy for the first tenant based on the indication from the ML model. Thus, in accordance with the techniques of the present disclosure, administrators may be capable of utilizing ML models to generate and update authentication policies based on the authentication policies of other tenants while refraining from manually observing the data of the other tenants.

In some other examples, an authentication server may receive, from a first device associated with a first user and from a second device associated with a second user, a first device access signal associated with a first network identifier that corresponds to the first device and a second device access signal associated with a second network identifier that corresponds to the second device, respectively. The authentication server may utilize a ML model to monitor the first and second device access signals to obtain assurance scores for the first and second network identifiers.

Moreover, using the assurance scores, the authentications server may generate a set of network zones that provide or restrict users the ability to access the applications, services, and networks associated with the organization. Therefore, in accordance with the techniques of the present disclosure, administrators may be capable of utilizing ML models to monitor device access signals and then generate network zones which is relatively more efficient and reliable compared to an administrator manually observing data associated with device access signals to generate network zones.

In some cases, the ML models may generate an initial set of authentication rules for the authentication policy for the first tenant. For example, based on a set of applications being used by the users of the first tenant, an ML model may generate an authentication policy based on the authentication rules used by other tenants that access one or more applications of the set of applications of the first tenant. Moreover, the authentication policy generation may be performed in a privacy preservation scheme such that the authentication server refrains from exposing sensitive data associated with tenants. In some other cases, when the authentication server generates a set of network zones via a ML model for a tenant of a multi-tenant system, the authentications server may transmit a recommendation to an administrator to establish the set of network zones. In such cases, the administrator may accept or deny the recommendation from the authentication server that is based on the ML generations.

Thus, the techniques of the present disclosure may enable organizations and administrators of organizations the capability of utilizing ML models to automatically observe and monitor data to automatically create or update authentication policies and network zones. For example, the ML models may allow relatively large sets of data to be monitored and observed in a relatively efficient and reliable manner compared to being done manually by an administrative user. Moreover, the techniques of the present disclosure may enable the authentication policies and network zones to be based on data associated with other tenants or organizations while refraining from exposing the data of the respective tenants. For example, the ML model may recommend authentication rules utilized by other tenants or may recommend network zones used by other tenants, and an administrative user that receives such recommendations may be unable to access the data associated with the other tenants that the recommendations are based on. Therefore, the techniques of the present disclosure may provide organizations with relatively more efficient, secure, and reliable techniques of establishing and updating authentication policies and network zones to provide a secure system for organizations.

Aspects of the disclosure are initially described in the context of a computing system. Additional aspects of the disclosure are described with reference to computing systems and process flows. Aspects of the disclosure are further illustrated by and described with reference to apparatus diagrams, system diagrams, and flowcharts that relate to dynamic policy and network security zone generation.

FIG. 1 illustrates an example of a computing system 100 that supports dynamic policy and network security zone generation in accordance with various aspects of the present disclosure. The computing system 100 includes a computing device 105 (such as a desktop, laptop, smartphone, tablet, or the like), an on-premises system 115, an identity management system 120, and a cloud system 125, which may communicate with each other via a network, such as a wired network (e.g., the Internet), a wireless network (e.g., a cellular network, a wireless local area network (WLAN)), or both. In some cases, the network may be implemented as a public network, a private network, a secured network, an unsecured network, or any combination thereof. The network may include various communication links, hubs, bridges, routers, switches, ports, or other physical and/or logical network components, which may be distributed across the computing system 100.

The on-premises system 115 (also referred to as an on-premises infrastructure or environment) may be an example of a computing system in which a client organization owns, operates, and maintains its own physical hardware and/or software resources within its own data center(s) and facilities, instead of using cloud-based (e.g., off-site)

resources. Thus, in the on-premises system 115, hardware, servers, networking equipment, and other infrastructure components may be physically located within the "premises" of the client organization, which may be protected by a firewall 140 (e.g., a network security device or software application that is configured to monitor, filter, and control incoming/outgoing network traffic). In some examples, users may remotely access or otherwise utilize compute resources of the on-premises system 115, for example, via a virtual private network (VPN).

In contrast, the cloud system 125 (also referred to as a cloud-based infrastructure or environment) may be an example of a system of compute resources (such as servers, databases, virtual machines, containers, and the like) that are hosted and managed by a third-party cloud service provider using third-party data center(s), which can be physically co-located or distributed across multiple geographic regions. The cloud system 125 may offer high scalability and a wide range of managed services, including (but not limited to) database management, analytics, ML, artificial intelligence (AI), etc. Examples of cloud systems 125 include (AMAZON WEB SERVICES) AWS®, MICROSOFT AZURE®, GOOGLE CLOUD PLATFORM®, ALIBABA CLOUD®, ORACLE® CLOUD INFRASTRUCTURE (OCI), and the like.

The identity management system 120 may support one or more services, such as a single sign-on (SSO) service 155, a multi-factor authentication (MFA) service 160, an application programming interface (API) service 165, a directory management service 170, or a provisioning service 175 for various on-premises applications 110 (e.g., applications 110 running on compute resources of the on-premises system 115) and/or cloud applications 110 (e.g., applications 110 running on compute resources of the cloud system 125), among other examples of services. The SSO service 155, the MFA service 160, the API service 165, the directory management service 170, and/or the provisioning service 175 may be individually or collectively provided (e.g., hosted) by one or more physical machines, virtual machines, physical servers, virtual (e.g., cloud) servers, data centers, or other compute resources managed by or otherwise accessible to the identity management system 120.

A user 185 may interact with the computing device 105 to communicate with one or more of the on-premises system 115, the identity management system 120, or the cloud system 125. For example, the user 185 may access one or more applications 110 by interacting with an interface 190 of the computing device 105. In some implementations, the user 185 may be prompted to provide some form of identification (such as a password, personal identification number (PIN), biometric information, or the like) before the interface 190 is presented to the user 185. In some implementations, the user 185 may be a developer, customer, employee, vendor, partner, or contractor of a client organization (such as a group, business, enterprise, non-profit, or startup that uses one or more services of the identity management system 120). The applications 110 may include one or more on-premises applications 110 (hosted by the on-premises system 115), mobile applications 110 (configured for mobile devices), and/or one or more cloud applications 110 (hosted by the cloud system 125).

The SSO service 155 of the identity management system 120 may allow the user 185 to access multiple applications 110 with one or more credentials. Once authenticated, the user 185 may access one or more of the applications 110 (for example, via the interface 190 of the computing device 105). That is, based on the identity management system 120 authenticating the identity of the user 185, the user 185 may obtain access to multiple applications 110, for example, without having to re-enter the credentials (or enter other credentials). The SSO service 155 may leverage one or more authentication protocols, such as Security Assertion Markup Language (SAML) or OpenID Connect (OIDC), among other examples of authentication protocols. In some examples, the user 185 may attempt to access an application 110 via a browser. In such examples, the browser may be redirected to the SSO service 155 of the identity manage-ment system 120, which may serve as the identity provider (IdP). For example, in some implementations, the browser (e.g., the user's request communicated via the browser) may be redirected by an access gateway 130 (e.g., a reverse proxy-based virtual application configured to secure web applications 110 that may not natively support SAML or OIDC).

In some examples, the access gateway 130 may support integrations with legacy applications 110 using hypertext transfer protocol (HTTP) headers and Kerberos tokens, which may offer universal resource locator (URL)-based authorization, among other functionalities. In some examples, such as in response to the user's request, the IdP may prompt the user 185 for one or more credentials (such as a password, PIN, biometric information, or the like) and the user 185 may provide the requested authentication credentials to the IdP. In some implementations, the IdP may leverage the MFA service 160 for added security. The IdP may verify the user's identity by comparing the credentials provided by the user 185 to credentials associated with the user's account. For example, one or more credentials asso-ciated with the user's account may be registered with the IdP (e.g., previously registered, or otherwise authorized for authentication of the user's identity via the IdP). The IdP may generate a security token (such as a SAML token or Oath 2.0 token) containing information associated with the identity and/or authentication status of the user 185 based on successful authentication of the user's identity.

The IdP may send the security token to the computing device 105 (e.g., the browser or application 110 running on the computing device 105). In some examples, the applica-tion 110 may be associated with a service provider (SP), which may host or manage the application 110. In such examples, the computing device 105 may forward the token to the SP. Accordingly, the SP may verify the authenticity of the token and determine whether the user 185 is authorized to access the requested applications 110. In some examples, such as examples in which the SP determines that the user 185 is authorized to access the requested application, the SP may grant the user 185 access to the requested applications 110, for example, without prompting the user 185 to enter credentials (e.g., without prompting the user to log-in). The SSO service 155 may promote improved user experience (e.g., by limiting the number of credentials the user 185 has to remember/enter), enhanced security (e.g., by leveraging secure authentication protocols and centralized security policies), and reduced credential fatigue, among other ben-efits.

The MFA service 160 of the identity management system 120 may enhance the security of the computing system 100 by prompting the user 185 to provide multiple authentication factors before granting the user 185 access to applications 110. These authentication factors may include one or more knowledge factors (e.g., something the user 185 knows, such as a password), one or more possession factors (e.g., some-thing the user 185 is in possession of, such as a mobile app-generated code or a hardware token), or one or more inherence factors (e.g., something inherent to the user 185, such as a fingerprint or other biometric information). In some implementations, the MFA service 160 may be used in conjunction with the SSO service 155. For example, the user 185 may provide the requested login credentials to the identity management system 120 in accordance with an SSO flow and, in response, the identity management system 120 may prompt the user 185 to provide a second factor, such as a possession factor (e.g., a one-time passcode (OTP), a hardware token, a text message code, an email link/code). The user 185 may obtain access (e.g., be granted access by the identity management system 120) to the requested applications 110 based on successful verification of both the first authentication factor and the second authentication factor.

The API service 165 of the identity management system 120 can secure APIs by managing access tokens and API keys for various client organizations, which may enable (e.g., only enable) authorized applications (e.g., one or more of the applications 110) and authorized users (e.g., the user 185) to interact with a client organization's APIs. The API service 165 may enable client organizations to implement customizable login experiences that are consistent with their architecture, brand, and security configuration. The API service 165 may enable administrators to control user API access (e.g., whether the user 185 and/or one or more other users have access to one or more particular APIs). In some examples, the API service 165 may enable administrators to control API access for users via authorization policies, such as standards-based authorization policies that leverage OAuth 2.0. The API service 165 may additionally, or alter-natively, implement role-based access control (RBAC) for applications 110. In some implementations, the API service 165 can be used to configure user lifecycle policies that automate API onboarding and off-boarding processes.

The directory management service 170 may enable the identity management system 120 to integrate with various identity sources of client organizations. In some implemen-tations, the directory management service 170 may commu-nicate with a directory service 145 of the on-premises system 115 via a software agent 150 installed on one or more computers, servers, and/or devices of the on-premises sys-tem 115. Additionally, or alternatively, the directory man-agement service 170 may communicate with one or more other directory services, such as one or more cloud-based directory services. As described herein, a software agent 150 generally refers to a software program or component that operates on a system or device (such as a device of the on-premises system 115) to perform operations or collect data on behalf of another software application or system (such as the identity management system 120).

The provisioning service 175 of the identity management system 120 may support user provisioning and deprovision-ing. For example, in response to an employee joining a client organization, the identity management system 120 may automatically create accounts for the employee and provide the employee with access to one or more resources via the accounts. Similarly, in response to the employee (or some other employee) leaving the client organization, the identity management system 120 may autonomously deprovision the employee's accounts and revoke the employee's access to the one or more resources (e.g., with little to no intervention from the client organization). The provisioning service 175 may maintain audit logs and records of user deprovisioning events, which may help the client organization demonstrate compliance and track user lifecycle changes. In some imple-mentations, the provisioning service 175 may enable administrators to map user attributes and roles (e.g., permissions, privileges) between the identity management system 120 and connected applications 110, ensuring that user profiles are consistent across the identity management system 120, the on-premises system 115, and the cloud system 125.

Although not depicted in the example of FIG. 1, a person skilled in the art would appreciate that the identity management system 120 may support or otherwise provide access to any number of additional or alternative services, applications 110, platforms, providers, or the like. In other words, the functionality of the identity management system 120 is not limited to the exemplary components and services mentioned in the preceding description of the computing system 100. The description herein is provided to enable a person skilled in the art to make or use the present disclosure. Various modifications to the present disclosure will be readily apparent to those skilled in the art, and the generic principles defined herein may be applied to other variations without departing from the scope of the present disclosure. Accordingly, the present disclosure is not limited to the examples and designs described herein, but is to be accorded the broadest scope consistent with the principles and novel features disclosed herein.

In some examples of the computing system 100, an organization may have an authentication policy for the users 185 to follow when accessing one or more applications 110. In some cases, the authentication policy may indicate one or more authentication rules for a respective user when accessing a respective app. For example, the authentication policy may indicate that when accessing a first application 110, a developer user 185 should user the MFA service 160 to access the first application 110. In accordance with the techniques of the present disclosure, an authentications server may utilize a ML model to generate or provide updates to the authentication policy of a tenant of a multitenant authentication platform. For example, the authentication policy may establish an authentication policy that includes a first set of authentication rules for the users 185 of the first tenant to access one or more applications 110 associated with the first tenant. The authentication server may then receive an indication from an ML model to update the authentication policy of the first tenant based on a second set of authentication rules associated with one or more second tenants and one or more applications common to the first tenant and the one or more second tenants.

For example, the second set of authentication rules may indicate that a tenant that has the MFA service 160 enabled for a first application 110 may also have the MFA service 160 enabled for a second application 110 and having the MFA service 160 enabled for both the first and the second application 110 can result in a relatively more robust and secure system. Further, the ML model may monitor and observe access requests for the applications 110 used by the tenants of the multi-tenant authentication system to determine which authentication rules provide a relatively secure system. For example, a system may consider secure based on a quantity of successful and accurate access requests and a quantity of unsuccessful access requests from fraudulent users. Therefore, if the ML model determines that a second tenant with the MFA service 160 enabled for a first and second application 110 provides a relatively more secure system, the ML model may indicate for the authentication server to add the MFA service 160 to the authentication policy of a first tenant when accessing the second application 110. Further descriptions of the techniques of the present disclosure using ML models to generate and adapt authentication policies may be described elsewhere herein, such as with reference to FIGS. 2 and 3.

In some other examples of the computing system 100, an organization may establish a set of network zones for users 185 of the organization to access applications 110, services, and networks associated with the organization. For example, a first network zone may be based on the IP addresses and the geographic location of an office building associated with the organization such that an authentication server trusts and allows access to users 185 within the first network zone. Moreover, a second network zone may be associated with one or more IP addresses and geographic locations in a location that is unaffiliated with the organization and the authentication server may refrain from trusting device access signals from the second network zone. In accordance with the techniques of the present disclosure, to allow the establishment and update to network zones to be relatively more efficient and reliable, an administrator (e.g., a user 185) may utilize a ML model to monitor device access signals.

For example, the authentication server may use a ML model to monitor device access signals from different users 185 and devices (e.g., computing devices 105) to obtain assurance scores associated with the network identifiers of the device access signals. In some cases, the assurance score of a respective network identifier of a device access signal may indicate that the device, the user 185, or both are trustworthy (e.g., the device is managed by the organization, the user is an employee of the organization) and the network identifier may be used to generate a network zone where device access signals are trusted. In some other cases, the assurance score may indicate that the device, the user 185, or both are untrustworthy and the network identifier may be used to generate a network zone where device access signals are untrustworthy and users 185 are denied access to applications 110, services, and networks associated with an organization. Additionally, or alternatively, the authentication server may utilize data associated with other tenants to generate network zones. For example, a set of network identifiers that are untrusted by one tenant may be used to generate an untrustworthy network zone for another tenant. Further descriptions of the techniques of the present disclosure using ML models to generate and adapt network zones may be described elsewhere herein, such as with reference to FIGS. 4 and 5.

Figure 2:
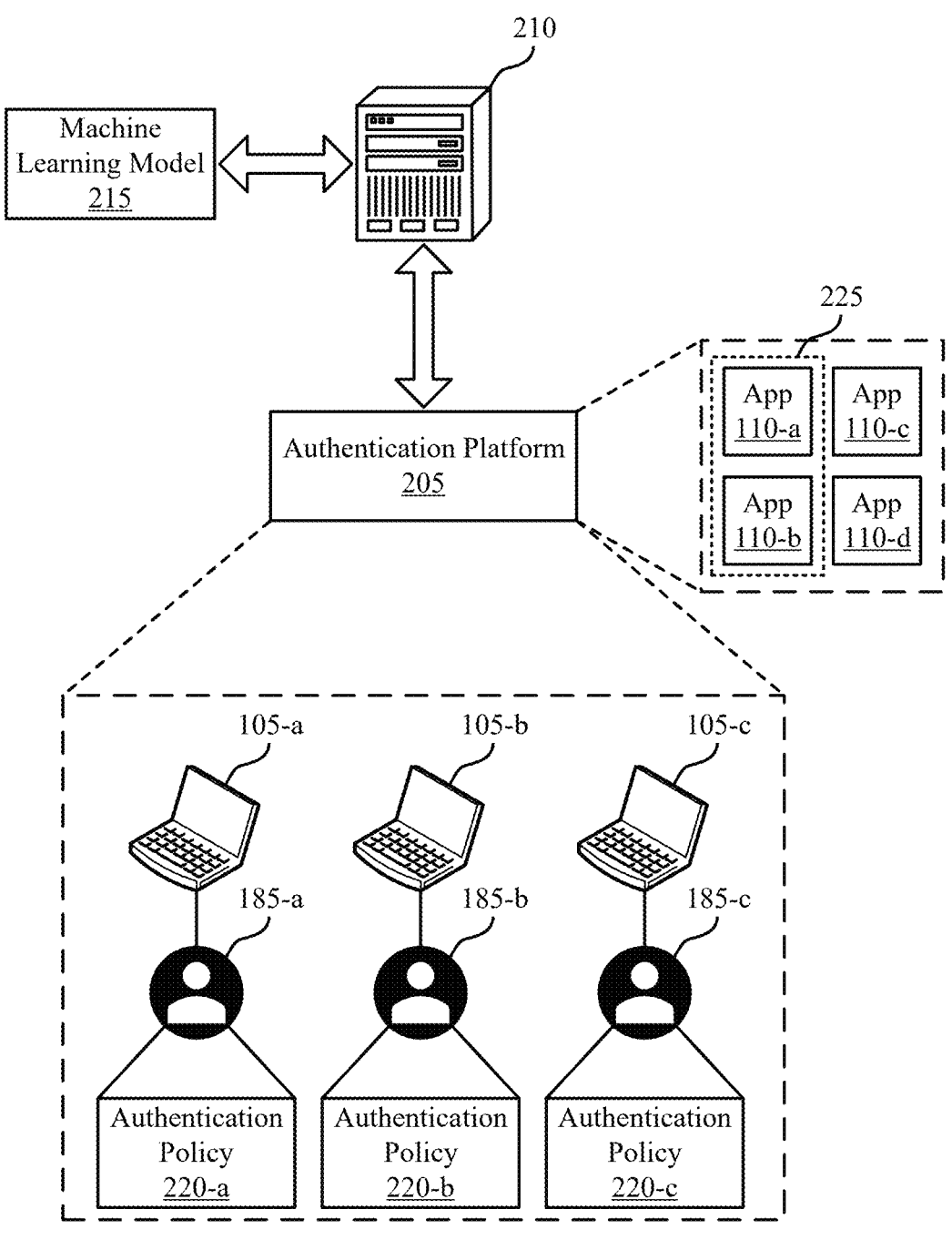

FIG. 2 shows an example of a computing system 200 that supports dynamic policy and network security zone generation in accordance with aspects of the present disclosure. In some examples, the computing system 200 may be implemented by or may implement the computing system 100. For example, the computing system 200 may include a user 185-*a* of a computing device 105-*a*, a user 185-*b* of a computing device 105-*b*, and a user 185-*c* of a computing device 105-*c*, which may be examples of devices and services described with reference to FIG. 1. Further, the users 185 may be users 185 of an organization that is a tenant of a multi-tenant authentication platform 205 that may communicate with an authentication server 210 to provide the users 185 access to the one or more applications 110 (e.g., application 110-*a*, applications 110-*b*, application 110-*c*, application 110-*d*). It should be each tenant or organization may be associated with a set of users 185 and the users 185 illustrated herein may be an example of a user 185 of a set of users 185 of the tenant. Further, the authentication server 210 may communicate and coordinate with an ML model 215 in accordance with the techniques of the present disclosure.

In some examples, to ensure a secure system, a tenant of the multi-tenant authentication platform 205 (e.g., an organization) may establish an authentication policy 220 (e.g., an authentication policy 220-*a* for the user 185-*a*, an authentication policy 220-*b* for the user 185-*b*, an authentication policy 220-*c* for the user 185-*c*) with the multi-tenant authentication platform 205 for the users 185 of the tenant. In some cases, a respective authentication policy 220 may be associated with a respective set of applications 110 associated with a respective tenant. Further, the respective authentication policy 220 may include a set of authentication rules for the users 185 associated with the respective tenant to access the respective set of applications 110. For example, the authentication server 210 may establish the authentication policy 220-*a* for a first tenant of the multi-tenant authentication platform 205 that is associated with a set of applications 110 that includes the application 110-*a*, the applications 110-*b*, the application 110-*c*, and the application 110-*c*. The authentication policy 220-*a* may further indicate a first set of authentication rules for the users 185 of the first tenant (e.g., the user 185-*a*) to access the set of applications 110.

In some cases, the set of authentication rules for a respective authentication policy 220 may indicate an authentication procedure for a user 185 to perform to access a respective application 110. For example, an authentication rule of the authentication policy 220-*a* may indicate that the user 185-*a* may perform dual factor authentication (e.g., an MFA service 160 as described with reference to FIG. 1) via the computing device 105-*a* to access the application 110-*a*. In some examples, when the authentication server 210 is establishing the authentication policy 220 for a tenant, the authentication server 210 may receive an indication of one or more authentication rules associated with access to the one or more applications of the set of applications of a respective tenant from one or more user inputs of a first user of the respective tenant. For example, the authentication server 210 may receive one or more user inputs from the user 185-*a* that include one or more indications of one or more authentication rules such that the first set of authentication rules for the authentication policy 220-*a* are based on the one or more user inputs.

In some examples, as described elsewhere herein, to generate or establish the authentication policies 220 for tenants, an administrator of an organization or company may create the respective authentication policy 220 by identifying high risk cases and appropriate actions for the high risk cases. For example, an administrator for a tenant of the user 185-*a* may identify that the application 110-*a* includes sensitive data (e.g., confidential information. personal identifiable information (PII)) and the user 185-*a* accessing the application 110 may be associated with a relatively high risk. Therefore, the administrator may configure an authentication rule for the authentication policy 220-*a* that expects the user 185-*a* to perform authentication prior to accessing the application 110-*a*. For example, the authentication rule may indicate the user 185-*a* should use an MFA service 160 when accessing the application 110-*a* or another type of authentication procedure. However, identifying such high risk events may be relatively time consuming and having the administrator perform such identification manually can result in one or more events being missed thus reducing the reliability and effectiveness of a respective authentication policy 220.

To ensure that a tenant is configured with a reliable authentication policy 220, in accordance with the techniques of the present disclosure, the authentication server 210 may utilize a ML model 215. In some examples, the ML model 215 may be used to automatically generating authentication policies 220 using data associated with the tenants of the multi-tenant authentication platform 205. For example, the authentication server 210 may have access to the data of the authentication policies 220 of each tenant of the multi-tenant authentication platform 205. Therefore, the authentication server 210 may utilize the ML model 215 to identify high-risk and low-risk events based on the successes from multiple users 185 and devices 105 of the different tenants. The ML model 215 may further identify high assurance factors that are successful for high-risk cases (e.g., login attempts for an application 110 with sensitive data). Moreover, the ML model 215 may identify, based on the authentication policies 220 of the respective tenants of the multi-tenant authentication platform 205 that one or more authentication rules can provide a relatively more secure system. Thus, the authentication server 210 may use cross-tenant data and the ML model 215 to identify application 110 correlations that can be recommended to tenants being onboarded in the multi-tenant authentication platform 205.

For example, if a first tenant or organization associated with the user 185-*a* onboards, establishes, or joins the multi-tenant authentication platform 205, opposed to having an administrator of the organization establish the authentication policy 220-*a*, the multi-tenant authentication platform 205 may utilize the ML model 215 to generate the authentication policy 220-*a*. As part of generating the authentication policy 220-*a*, the ML model 215 may analyze the set of applications 110 associated with the first tenant that the user 185-*a* may access. For example, when onboarding with the multi-tenant authentication platform 205, an administrator of the first tenant may identify that the user 185-*a* may access the application 110-*a*, the applications 110-*b*, the application 110-*c*, the application 110-*d*, or any combination thereof. Based on the indication of the applications 110 associated with a tenant, the ML model 215 may generate an update to the authentication policy 220-*a* or generate the authentication policy 220-*a* based on the authentication rules of the authentication policies of one or more second tenants (e.g., the authentication policy 220-*b*, the authentication policy 220-*c*, or both).

In some examples, the ML model 215 may identify that a second tenant associated with the user 185-*b* and a third tenant associated with the user 185-*c* may both be associated with a subset 225 of applications 110 of the set of applications 110 associated with the first tenant. Based on the identification, the authentication server 210 may utilize the ML model 215 to observe the success of the authentication rules in the authentication policy 220-*b* and the authentication policy 220-*c* associated with the application 110-*a* and the applications 110-*b*. In some cases, the ML model 215 may identify a correlation between the authentication rules for the application 110-*a* and the applications 110-*b* within the authentication policy 220-*b* and the authentication policy 220-*c*. For example, the ML model 215 may monitor and analyze authentication signals from the users 185 of the second tenant (e.g., the user 185-*b*) and the users 185 of the third tenant (e.g., the user 185-*c*) to determine association patterns.

In some examples, based on the monitoring, the ML model 215 may identify that having a respective authentication procedure (e.g., an MFA service 160) enabled for both the application 110-*a* and the applications 110-*b* may provide a relatively more secure system than having the respective authentication procedure enabled for the application 110-*a* or the applications 110-*b*. For example, if the authentication policy 220-*b* of the second tenant may have an MFA service 160 enabled for accessing the application 110-*a* due to the application 110-*a* having sensitive data but may refrain from enabling the MFA service 160 for users 185 (e.g., the user 185-*b*) to access the applications 110-*b*. However, if the applications 110-*b* can access the data stored within the application 110-*a*, if the authentication policy 220-*b* refrains from expecting users 185 to use the MFA service 160 when accessing the applications 110-*b*, fraudulent users may be capable of accessing the sensitive data of the application 110-*a* relatively more easily by accessing the applications 110-*b*. Thus, in some cases, the data associated with the authentication policy 220-*b* (e.g., the data stored from the authentication signals of users 185 associated with the second tenant) may indicate that fraudulent users 185 can access the applications 110-*b* and thus are capable of accessing the sensitive data stored within the application 110-*a*.

In such examples, the authentication policy 220-*c* of the third tenant of the MFA service 160 may have the MFA service 160 enabled for both the application 110-*a* and the applications 110-*b* and the data associated with the authentication policy 220-*c* may indicate relatively few or no access to the application 110-*a* or the applications 110-*b* by fraudulent users 185. Therefore, the ML model 215 may identify that having the MFA service 160 enabled for users 185 to access both the application 110-*a* and the applications 110-*b* may reduce the likelihood of fraudulent users 185 accessing the sensitive data of the application 110-*a*. Thus, since the users 185 of the first tenant may access the application 110-*a* and the applications 110-*b*, the authentication server 210 may receive an indication from the ML model 215 to update the authentication policy 220-*a* with authentication rules indicating for users to use the MFA service 160 to access the application 110-*a* and to access the applications 110-*b*. Moreover, in such examples, the first may be unaware of the authentication policy 220-*b* of the second tenant and the authentication policy 220-*c* of the third tenant as the ML model 215 may generate the authentication rules in accordance with a privacy preservation scheme. For example, the authentication server 210 and the ML model 215 may refrain from exposing any data associated with the second tenant or the third tenant to the first tenant when generating the authentication rules for the authentication policy 220-*a*.

Additionally, or alternatively, in some cases, the first tenant may onboard or join the multi-tenant authentication platform 205 with a first set of authentication rules for the authentication policy 220-*a*. Thus, the authentication server 210 may receive an indication from the ML model 215 to update the authentication policy 220-*a* based on the authentication rules of the other tenants in the multi-tenant authentication platform 205 as described herein. In some other cases, the first tenant may refrain from generating any authentication rules and the authentication server 210 may generate the first set of authentication rules for the first tenant based on an indication from the ML model 215 of the authentication rules used by the other tenants of the multi-tenant authentication platform 205. Therefore, the authentication server 210 may use the ML model 215 to generate an initial set of authentication rules for an authentication policy 220 or to update the set of authentication rules of an authentication policy.

In some cases, the authentication server 210 may automatically update the authentication policy 220 based on receiving the indication from the ML model 215. In some other cases, the authentication server 210 may transmit an indication to an administrator of a tenant to accept or deny the authentication rules generated by the ML model 215 before updating the authentication policy 220 of the tenant. Additionally, or alternatively, when a user 185 or tenant adds an additional application 110 to the set of applications that the users 185 of a first tenant may access, the authentication server 210 may use the ML model 215 may analyze if any of the other tenants of the multi-tenant authentication platform 205 use the additional application. Based on the data of the other tenants, the ML model 215 may recommend for the multi-tenant authentication platform 205 to update the authentication policy 220 of a respective tenant.

In some examples, the authentication server 210 may receive the indication from the ML model 215 to update an authentication policy 220 with a second set of authentication rules based on the second set of authentication rules satisfying a first threshold that is associated with a first quantity of successful access attempts and a second quantity of unsuccessful access requests. For example, the authentication server 210 may receive one or more access request messages from one or more users 185 associated with one or more respective tenants (e.g., the user 185-*a* associated with a first tenant, the user 185-*b* associated with a second tenant, the user 185-*c* associated with a third tenant, or any combination thereof) to access a respective application 110. Moreover, the one or more access request messages may include data associated with the one or more users 185.

For example, a respective access request message from the user 185-*a* may include data associated with the user 185-*a*. In some cases, the data associated with ther user 185-*a* may include an indication of whether the user 185-*a* is associated with a tenant and if so which tenant of the multi-tenant authentication platform 205, information associated with the computing device 105-*a* used by the user 185-*a*, a role of the user 185-*a* within an organization, a set of permissions for the user 185-*a* within a set of applications 110, or any combination thereof. Based on receiving the one or more access requests, the authentication server 210 may transmit a second indication to indicate a successful or unsuccessful access request based on the data of the one or more access requests.

Moreover, the data associated with the one or more users 185 may indicate an affiliation of a user 185 with a respective tenant. Further, the first threshold for a respective authentication rule may be satisfied based on whether the first quantity of successful access requests that are associated with an unaffiliated user 185 satisfying a second threshold and the second quantity of unsuccessful access requests that are associated with an unaffiliated user 185 satisfying a third threshold. For example, the first threshold for a respective authentication rule may be satisfied based on a quantity of successful access request from unaffiliated users 185 (e.g., fraudulent users 185) being below the second threshold and a quantity of unsuccess access requests from unaffiliated users 185 being above the third threshold. Thus, the first threshold may be satisfied based on whether fraudulent users 185 are impeded from accessing a respective application 110.

In some examples, to enable the ML model 215 to generate authentication rules to update an authentication policy, the ML model 215 may be trained via supervised learning and reinforcement learning. Supervised learning may be an example of a form of ML training that trains a model using labeled data. For example, the ML model 215 may be trained on a set of access request messages that are labeled based on whether a respective user 185 should have been granted access to a respective application 110. Thus, the set of training data may include access request messages from users 185 that were correctly granted access to an application 110, access request messages from users 185 that were incorrectly granted access to an application 110, access request messages from users 185 that should have been granted access to an application 110, or any combination thereof. Further, the data may also be labeled by a type of user 185 as different user 185 types (e.g., a developer, end user, administrator) may be associated with different access permissions.

Moreover, the ML model 215 may be trained via reinforcement learning where agents learn to make decisions by performing actions (e.g., enabling authentication rules) to achieve a goal and are rewarded or penalized for correct and incorrect actions respectively. For example, the ML model 215 may determine what authentication procedures should be enabled to make accessing a respective application 110 secure. The ML model 215 may further weight or assign points to authentication rules based on subsequent data that identifies whether fraudulent users 185 were able to access the respective application 110. Once a respective authentication rule satisfies a threshold (e.g., a weight threshold or points threshold), the ML model 215 may transmit an indication to the authentication server 210 to update a respective authentication policy 220 with the respective authentication rule. Moreover, training the ML model 215 of the data of one or more tenants of the multi-tenant authentication platform 205 may enable the authentication server 210 to build models such as associated rule learners that assign users 185 to groups based on application 110 access patterns. For example, the user 185-*a* and the user 185-*b* may be grouped together as developers based on accessing the application 110-*a* and the applications 110-*b*. Additionally, or alternatively, the authentication server 210 may use the data of the multi-tenant authentication platform 205 for training the ML model 215 to determine a level of success for authentication rules and to determine a level of success for the authentication rules for different classifications of users 185.

Therefore, the authentication server 210 may utilize the ML model 215 to generate and update the authentication policies 220 for tenants of the multi-tenant authentication platform 205 without the input of a user 185, in accordance with the techniques of the present disclosure. The techniques of the present disclosure may further reduce the time consumption and complexity of generating an authentication policy 220. Moreover, the techniques of the present disclosure may enable the authentication policies 220 for tenants of the multi-tenant authentication platform 205 to be based on data of other tenants thus ensuring that the authentication policies 220 provide authentication rules that enhance the security for the respective tenants. Further descriptions of the techniques of the present disclosure for using an ML model 215 to generate and update authentication policies 220 may be descried elsewhere herein, such as with reference to FIG. 3.

Figure 3:
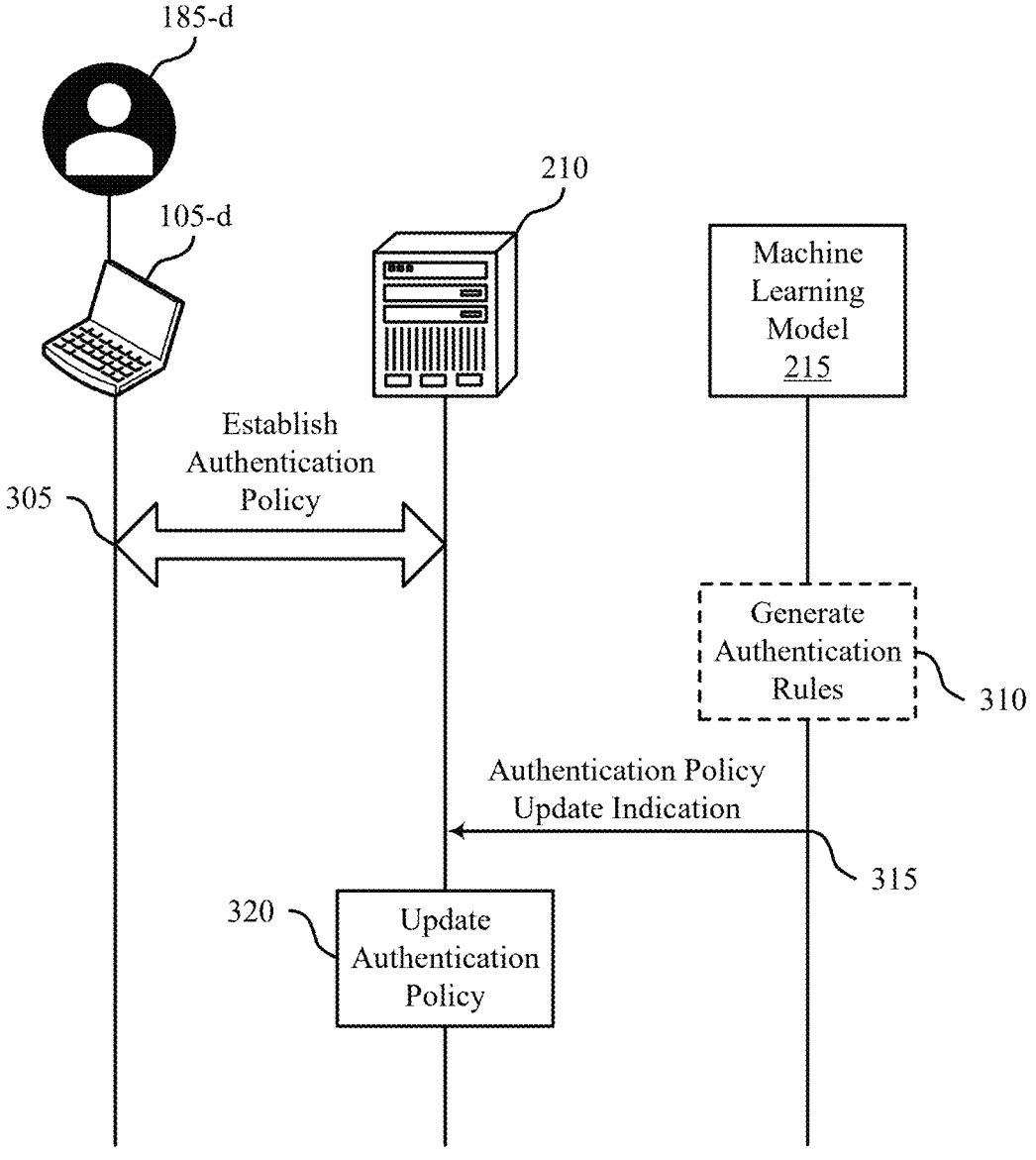
FIG. 3 shows an example of a process flow that supports dynamic policy and network security zone generation in accordance with aspects of the present disclosure.

FIG. 3 shows an example of a process flow 300 that supports dynamic policy and network security zone generation in accordance with aspects of the present disclosure. In some examples, the process flow 300 may be implemented by or may implement the computing system 100, the computing system 200, or both. For example, the process flow 300 may include a computing device 105-*d* associated with a user 185-*d*, an authentication server 210, and a machine learning model 215 which may be examples of devices or services described elsewhere herein with reference to FIGS. 1 and 2.

In the following description of the process flow 300, the operations between the computing device 105-*d* associated with the user 185-*d*, the authentication server 210, and the machine learning model 215 may be performed in different orders or at different times. Some operations may also be left out of the process flow 300, or other operations may be added. Although the computing device 105-*d* associated with the user 185-*d*, the authentication server 210, and the machine learning model 215 are shown performing the operations of the process flow 300, some aspects of some operations may also be performed by one or more other devices, services, or models described elsewhere herein including with reference to FIG. 1.

At 305, the authentication server 210 may establish, with the user 185-*d* of the computing device 105-*d*, an authentication policy for a first tenant of a multi-tenant authentication platform. The authentication policy may be associated with a set of applications 110 associated with the first tenant and the authentication policy may indicate a first set of authentication rules for users 185 associated with the first tenant (e.g., the user 185-*d*) to access the set of applications 110. In some examples, the authentication server 210 may receive, via one or more user inputs from the user 185-*d* of the computing device 105-*d* that is associated with the first tenant, an indication of one or more authentication rules associated with accessing one or more applications 110 of the set of applications. Moreover, the first set of authentication rules may include the one or more authentication rules such that the authentication policy for the first tenant is established based on receiving the one or more user inputs.

At 310, the ML model 215 may generate the first set of authentication rules for the authentication policy based on one or more authentication rules used by one or more second tenants of the multi-tenant authentication platform that are associated with accessing one or more applications 110 of the set of applications 110 that are common between the first tenant and the one or more second tenants. Moreover, the authentication server 210 may generate the first set of authentication rules in accordance with a privacy preservation scheme. In some examples, the authentication server 210 may train the ML model 215 using one or more sets of data. For example, the authentication server 210 may use a first set of data associated with a type of application 110 for each application 110 of the one or more applications 110, a second set of data associated with user 185 metadata of one or more sets of users 185 of each tenant of the multi-tenant authentication platform, a third set of data associated with a set of user 185 device (e.g., a computing device 105) data of one or more user 185 devices being used by the one or more sets of users 185, a fourth set of data associated with network conditions of an access request, or any combination thereof. Further, the type of application 110 for a respective application 110 indicated by the first set of data may be based on the respective application 110 being associated with sensitive data of a respective tenant.

At 315, the authentication server 210 may receive, from the ML model 215, an indication to update the authentication policy of the first tenant based on a second set of authentication rules associated with the one or more second tenants of the multi-tenant authentication platform. The second set of authentication rules may be associated with the one or more applications 110 of the set of applications 110 that are common to the first tenant and the one or more second tenants. In some examples, the authentication server 210 may receive from the user 185-*d* of the first tenant, an indication of an additional application 110 to be accessed by the users 185 associated with the first tenant and the indication to update the authentication policy for the first tenant may be received from the ML model 215 based on the user 185-*d* adding the additional application 110 to the set of applications 110 for access by the users 185 of the first tenant.

The indication to update the authentication policy may further be based on a first set of attributes associated with the user 185-*d* of the first tenant, a second set of attributes associated with a device (e.g., the computing device 105-*d*) used by the user 185-*d* to access the additional application 110, or a combination thereof. Further, the second set of authentication rules associated with the one or more second tenants may be associated with the additional application 110, a third set of attributes associated with a set of users 185 of the one or more second tenants, a fourth set of attributes associated with a set of devices (e.g., a set of computing devices 105) used by the set of users 185 to access the additional application 110, or any combination thereof.

In some examples, the authentication server 210 may receive the indication to update the authentication policy based on receiving, from the ML model 215, an indication that the second set of authentication rules satisfy a first threshold for accessing the one or more applications 110. The first threshold may be further based on a first quantity of successful access requests and a second quantity of unsuccessful access requests. For example, the authentication server 210 may receive, from one or more users 185 associated with one or more respective tenants, one or more access request messages to access a respective application. The one or more access request messages may include data associated with the one or more users 185. Ther authentication server 210 may then transmit, to the one or more users 185, a second indication to indicate a successful access request or an unsuccessful access request based on the data associated with the one or more users 185 of the one or more access request messages.

The data associated with the one or more users 185 may further indicate an affiliation of a user 185 with a respective tenant. Moreover, the first threshold for a respective authentication rule may be satisfied based on the first quantity of successful access requests that are associated with an unaffiliated user 185 satisfying a second threshold and the second quantity of unsuccessful access requests that are associated with an unaffiliated user 185 satisfying a third threshold. Moreover, in some cases, the authentication server 210 may receive, from one or more users 185 associated with each tenant, one or more access request messages including a first set of attributes associated with the one or more users 185 and a second set of attributes associated with one or more devices (e.g., computing devices 105) used by the one or more users 185 and may input the one or more access request messages into the ML model 215. Therefore, in such cases, the indication from the ML model 215 to update the authentication policy for the first tenant may be based on the one or more access request messages that are input into the ML model 215.

At 320, the authentication server 210 may update the authentication policy of the first tenant based on receiving the indication from the ML model 215. In some examples, the authentication server 210 may be automatically triggered to update the authentication policy of the first tenant based on receiving the indication from the ML model 215. In some other examples, the authentication server 210 may transmit a recommendation to a user 185 (e.g., an administrator) of the first tenant to update the authentication policy of the first tenant. The authentication server 210 may further receive, from the user 185, an indication of an acceptance or denial of the update to the authentication policy of the first tenant indicated by the ML model 215.

Figure 4:
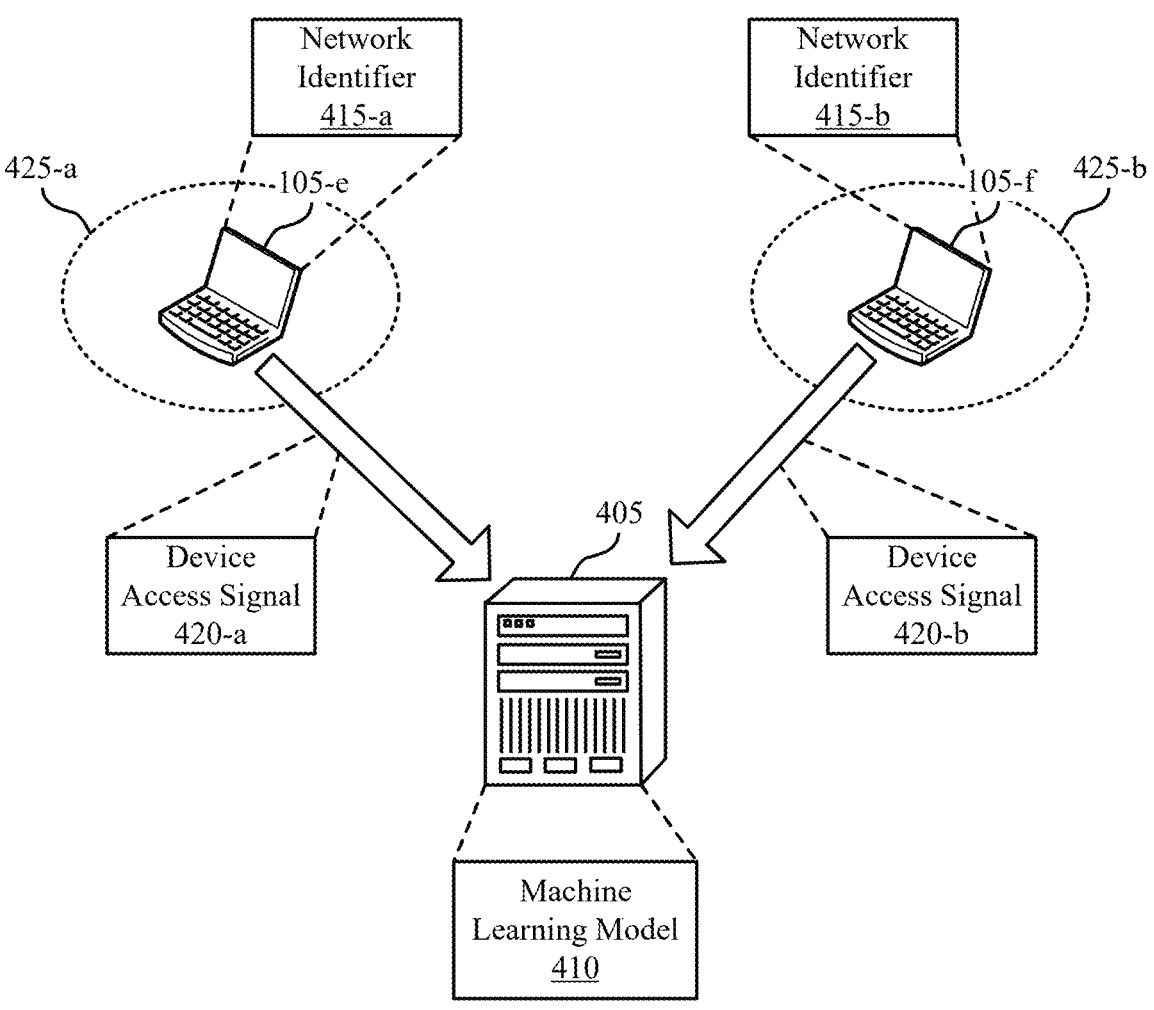
FIG. 4 shows an example of a computing system that supports dynamic policy and network security zone generation in accordance with aspects of the present disclosure.

FIG. 4 shows an example of a computing system 400 that supports dynamic policy and network security zone generation in accordance with aspects of the present disclosure. In some examples, the computing system 400 may be implemented by or may implement the computing system 100. For example, the computing system 400 may include a computing device 105-*e* and a computing device 105-*f* which may be examples of devices and services described with reference to FIG. 1. Further, the computing device 105-*e* and the computing device 105-*f* that may communicate with an authentication server 405 to provide the users access to the one or more applications 110, services, networks, or any combination thereof. Moreover, the authentication server 405 may communicate and coordinate with an ML model 410 in accordance with the techniques of the present disclosure.

In some examples, computing devices 105 (e.g., the computing device 105-*e* and the computing device 105-*f*) may be associated with network identifiers 415. For example, the computing device 105-*e* may be associated with a network identifier 415-*a* and the computing device 105-*f* may be associated with a network identifier 415-*b*. In some cases, a respective network identifier 415 may be an example of an IP address for a respective computing device 105, a geographical location (e.g., representative by a set of geographic coordinates) of a respective computing device 105, or a combination thereof. Thus, when a computing device 105 transmits a device access signal 420 (e.g., a device access signal 420-*a*, a device access signal 420-*b*, or both) to the authentication server 405 to request access to an application 110, the device access signal 420 may include an indication of the respective network identifier 415 of the computing device 105.

The device access signal 420 may also include data associated with the respective computing device 105 (e.g., an indication of a user 185 operating the computing device 105, an indication of an organization associated with the computing device 105, an indication of a management of the computing device 105, or any combination thereof). Moreover, in some cases, a computing device 105 may transmit the device access signal 420 via a phishing-resistant platform and the device access signal 420 may be associated with the phishing-resistant platform. For example, the computing device 105-*e* may transmit the device access signal 420-*a* via a phishing-resistant platform used to transmit authentication signals to an authentication server 405 to gain access to applications 110.

Based on the authentication server 405 receiving the device access signals 420 (e.g., the device access signal 420-*a*, the device access signal 420-*b*, or both) from the computing devices 105 (e.g., the computing device 105-*e*, the computing device 105-*f*, or both), the authentication server 405, an administrative user 185, or a combination thereof may generate one or more network zones 425 (e.g., a network zone 425-*a*, a network zone 425-*b*, or both). In some cases, network zones 425 may be used to aid and assist the authentication server 405 when authenticating computing devices 105 and corresponding users 185 requesting to access an application 110, a service, a network, or any combination thereof for an organization. For example, the network zone 425-*a* may be representative of a network zone 425 that is trusted by the authentication server 405 such that the authentication server 405 may be capable of expecting relatively less information within a device access signal

420 (e.g., the device access signal 420-*a*). In another example, the network zone 425-*b* may be representative of a network zone 425 that is untrusted by the authentication server 405 such that the authentication server 405 may automatically deny device access signals 420 (e.g., the device access signal 420-*b*) from the network zone 425-*b*. Additionally, or alternatively, for untrusted network zones 425, the authentication server 405 may expect relatively more information within the device access signals 420-*b* to authenticate a computing device (e.g., the computing device 105-*f*).

Moreover, network zones 425 may be representative of a set of network identifiers 415. For example, for a trusted network zone 425, the network zone 425 may be made up of a set of network identifiers 415 that are associated with trusted IP addresses or trusted locations. In some cases, a trusted IP address or a trusted location for an organization may correspond to an IP address or location of an office for the organization or a home of an employee of an organization. In another example, for an untrusted network zone, the network zone 425 may be made up of a set of network identifiers 415 unknown to the authentication server 405. For example, the set of network identifiers 415 may be unaffiliated with any tenant of a multi-tenant system associated with the authentication server 405.

To generate such network zones 425, an administrator user 185 may manually generate a first list of network identifiers 415 that are trusted and a second list of network identifiers 415 that are untrusted to generate one or more network zones 425. In some examples, a system may automatically generate a network zone 425 based on information stored within a database. For example, an administrator may establish a database of information associated with each user 185 of an organization, the typical locations of each user 185 (e.g., an office location, a home location, or both), information associated with office locations and network identifiers 415 associated with the organization, or any combination thereof. Thus, a system may be capable of analyzing the data to generate a set of network zones 425 that the authentication server 405 may trust.

Therefore, when the authentication server 405 receives a device access signal 420 from a computing device 105 (e.g., the device access signal 420-*a* from the computing device 105-*e*), the authentication server 405 may refrain from expecting additional authentication information from the computing device 105 (e.g., information from an MFA service 160). However, to generate network zones 425 that the authentication server 405 should refrain from trusting and should enable additional authentication procedures for (e.g., the MFA service 160), an administrator may have to manually instruct a system on a set of network identifiers to refrain from trusting to generate an untrusted network zone, which may be relatively time consuming and inefficient.

In accordance with the techniques of the present disclosure, the authentication server 405 may be capable of using a ML model 410 to automatically generate a set of network zones based on receiving the device access signals 420. In some examples, the device access signal 420 may be considered authentication signals or access request signals that are used by users 185 to authenticate with the authentication server 405 to access an application 110, service, network, or any combination thereof, of an organization. In some cases, the device access signals 420 may be transmitted via a phishing-resistant authentication platform such that the device access signals include additional information. For example, a respective device access signal 420 may include information associated with the properties of a corresponding computing device and the factors utilized from the computing device to log in. In some cases, the factors for logging in to a computing device 105 may include an indication of a level of security of the computing device 105.

For example, if the computing device 105 is capable of being accessed by any user 185 with no log-in information, the level of security may be relatively low. In another example, if the log-in requirements for the computing device 105 include users 185 submitting or providing biometric data (e.g., fingerprint data, facial recognition data, retina scan data, and the like), passwords, pins, or passphrases that satisfy one or more requirements (e.g., a threshold quantity of characters, a combination of different types of characters, a lack of personal information, and the like), or a combination thereof, the level of security for the computing device 105 may be relatively high.

Based on such information, the authentication server 405 may use the ML model 410 to obtain assurance scores or confidence scores for respective network identifiers 415 associated with respective device access signals 420 from respective computing devices 105. For example, the authentication server 405 may receive the device access signal 420-*a* from the computing device 105-*e* that is associated with a first user 185 where the device access signal 420-*a* corresponds to the network identifier 415-*a*. The authentication server 405 may further receive the device access signal 420-*b* from the computing device 105-*f* that is associated with a second user 185 where the device access signal 420-*b* corresponds to the network identifier 415-*b*. The authentication server 405 may then utilize the ML model 410 to monitor the device access signals 420 to obtain a first assurance score for the network identifier 415-*a* and a second assurance for the network identifier 415-*b*. In some examples, based on the first user 185 and the second user 185 being users 185 of organizations that are tenants of a multi-tenant platform, the ML model 410 may also utilize cross-tenant data of computing device 105 properties and log-in factors to generate the assurance scores for network identifiers 415. For example, if the authentication server 405 receives a device access signal 420 from a network identifier 415 that is untrusted by multiple tenants, the ML model 410 may generate a relatively low assurance score for the respective set of network identifiers 415. Thus, based on the assurance scores, the authentication server 405 may utilize the ML model 410 to generate a set of network zones 425.

For example, if the ML model 410 indicates that a respective device access signal 420 is associated with a relatively high assurance score, the authentication server 405 may identify the set of network identifiers 415 associated with the respective device access signal as a trusted network identifier 415 to be included in a trusted network zone 425. Moreover, the authentication server 405 may determine whether to include a network identifier 415 within a trusted network zone 425 or an untrusted network zone 425 based on whether the respective set of network identifiers 415 satisfies a first threshold (e.g., an assurance threshold). In some examples, tenants or organizations may further identify information associated with computing devices 105 that are managed by the organization and trusted factors used by the computing device 105 to assist the authentication server 405 and the ML model 410 in generating trusted network zones 425. In some other examples, such information may be inferred by the ML model 410 based on analyzing historical behavioral data of a tenant. For example, the authentication server 405 may store a list of previous device access signals 420 of a respective tenant with an indication of whether the device access signals 420 are trusted or untrusted.

In some cases, such information of whether a device access signal 420 should be trusted or not may be used to train the ML model 410 via supervised learning as described elsewhere herein with reference to FIG. 2. For example, the ML model 410 may be trained on a set of labeled data that indicates computing device profiles, log-in factors, or both with a safe or unsafe label. Therefore, the ML model 410 may be capable of using such training data to identify future device access signals 420 as trustworthy or untrustworthy. Moreover, the ML model 410 may include one or more ML algorithms that the authentication server 405 can utilize to detect anomalies based on a computing device 105 diverging from an baseline configuration for an organization. For example, if computing device 105-*f* is managed and trusted by the organization and follows the authentication procedures of an organization and the computing device 105-*f* transmits the device access signal 420-*b* from the network zone 425-*b* that is untrusted, the ML model 410 may detect an anomaly and determine whether the computing device 105-*f* should be granted access. In some cases, when anomalies are detected within a trusted or untrusted network zone 425, to ensure that an application 110, service, network, or any combination thereof of an organization remains secure, the ML model 410 may indicate to the authentication server 405 that additional authentication procedures should be performed.

For example, the authentication server 405 may indicate to a respective computing device to perform MFA authentication via a MFA service 160 or may indicate for the respective computing device 105 to answer a set of security questions. Therefore, in such cases when anomalies occur, if a computing device 105 is being operated via fraudulent user 185 within a trusted network zone 425 the fraudulent user 185 may still be restricted from accessing the application 110, service, or network of an organization. Moreover, if the computing device 105 associated with the device access signal 420 anomaly is trusted by an organization and is associated with a trusted user 185, the computing device may be granted access to the application 110, service, or network of an organization even while in an untrusted network zone 425.

Additionally, or alternatively, when the ML model 410 generates a set of network zones 425 for a tenant, in some cases, the authentication server 405 may transmit a recommendation to the tenant to establish the network zones 425. In some examples, the recommendation may explain or indicate the decision making pattern of the ML model 410 via explainable ML techniques. For example, the authentication server 405 may indicate that the ML model 410 indicated that 90% of all the device access signals 420 received by the authentication server 405 within a set of network identifiers 415 are associated with relatively high assurance scores and that the ML model 410 observed relatively little or no suspicious, fraudulent, or nefarious activity within the set of network identifiers 415. Based on receiving the recommendation from the authentication server 405, an administrative user 185 for a tenant may accept or deny the recommendation of network zones 425 to be established. In some cases, the recommendation may also include updates to an existing network zone 425. For example, the ML model 410 may identify that the efficiency of users accessing applications 110, services, or networks of an organization can be enhanced by expanding a network zone 425. In another example, if an organization expands a location, rather than generating a second network zone 425 right next to a first network zone 425, the ML model 410 may generate a network zone that expands the first network zone 425.

Therefore, in accordance with the techniques of the present disclosure, the authentication server 405 may be capable of utilizing the ML model 410 to automatically generate network zones 425 based on device access signals 420 received from computing devices 105. The techniques of the present disclosure may increase the efficiency, reliability, and security for a tenant by generating and updating network zones 425 in real-time as device access signals 420 are received rather than waiting for an issue to arise. Moreover, the techniques of the present disclosure may reduce the time consumption and complexity associated with generating network zones 425 and may enable the authentication server 405 to utilize data from other tenants of a multi-tenant system to enhance the security for the tenants of the multi-tenant system. Further descriptions of the techniques of the present disclosure may be described elsewhere herein, such as with reference to FIG. 5.

Figure 5:
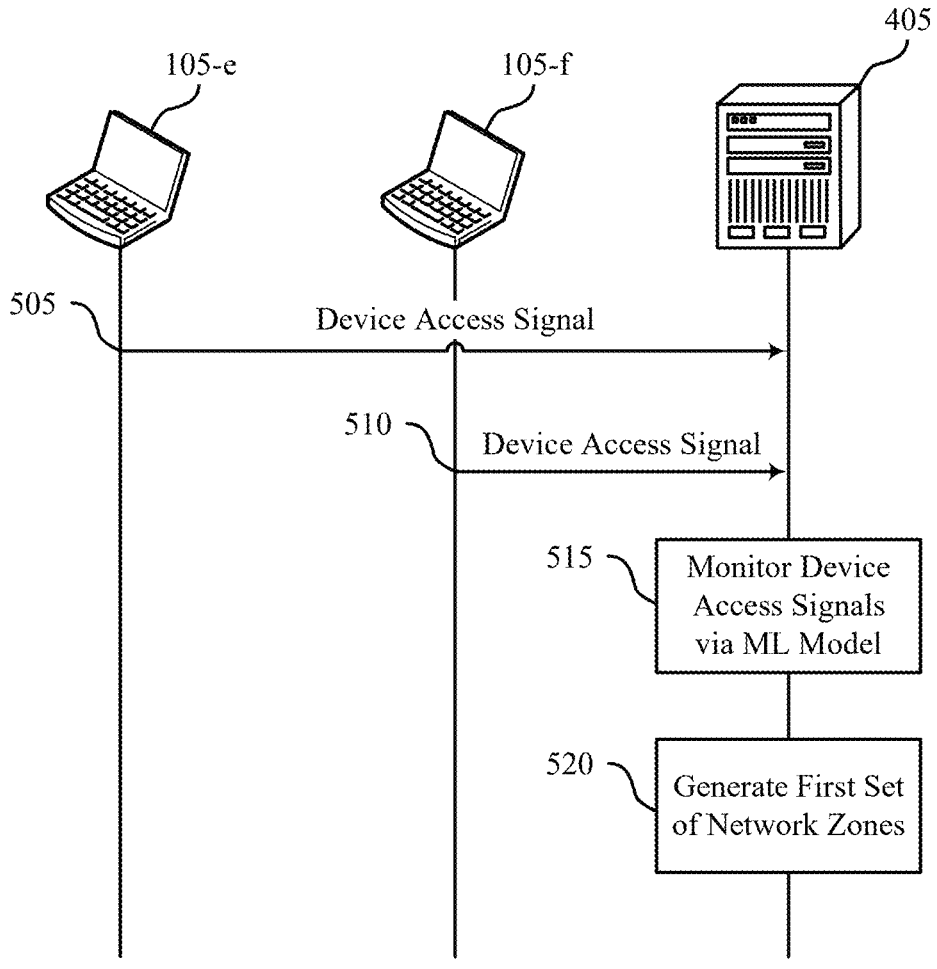
FIG. 5 shows an example of a process flow that supports dynamic policy and network security zone generation in accordance with aspects of the present disclosure.

FIG. 5 shows an example of a process flow 500 that supports dynamic policy and network security zone generation in accordance with aspects of the present disclosure. In some examples, the process flow 500 may be implemented by or may implement the computing system 100, the computing system 400, or both. For example, the process flow 500 may include a computing device 105-*e*, a computing device 105-*f*, and an authentication server 405 that is associated with a machine learning model (e.g., the ML model 410) which may be examples of devices or services described elsewhere herein with reference to FIGS. 1 and 4.

In the following description of the process flow 500, the operations between the computing device 105-*e*, the computing device 105-*f*, and the authentication server 405 may be performed in different orders or at different times. Some operations may also be left out of the process flow 500, or other operations may be added. Although the computing device 105-*e*, the computing device 105-*f*, and the authentication server 405 are shown performing the operations of the process flow 500, some aspects of some operations may also be performed by one or more other devices, services, or models described elsewhere herein including with reference to FIG. 1.

At 505, the authentication server 405 may receive, from a first device (e.g., the computing device 105-*e*) associated with a first user 185, a first device access signal associated with a first network identifier that corresponds to the first device.

At 510, the authentication server 405 may receive, from a second device (e.g., the computing device 105-*f*) associated with a second user 185, a second device access signal associated with a second network identifier that corresponds to the second device. In some examples, the first device access signal, the second device access signal, or both may be associated with a phishing-resistant platform, data associated with a respective tenant of a multi-tenant system, a network identifier associated with the respective tenant, a respective device that is managed by the respective tenant, or any combination thereof. Further, in some cases, a respective network identifier of a respective device access signal may include an IP address, an indication of a geographic location, or both. Additionally, or alternatively, the first device access signal may indicate a first set of data associated with the first device and the first user and the second device access signal may indicate a second set of data associated with the second device and the second user.

At 515, the authentication server 405 may monitor, via the ML model 410, the first device access signal and the second device access signal. Moreover, the ML model 410 may monitor the device access signals to obtain a first assurance score for the first network identifier associated with the first device access signal and to obtain a second assurance score for the second network identifier associated with the second device access signal. Further, the first assurance score and the second assurance score may be obtained from the ML model 410 based on a first set of data that is associated with one or more tenants of the multi-tenant system. In some examples, the ML model 410 may monitor the data of a respective access signal that is associated with a respective device and a respective user to obtain a respective assurance score for a respective network identifier associated with the respective device access signal.

At 520, the authentication server 405 may generate, for a first tenant of the multi-tenant system via the ML model 410, a first set of network zones that include the first network identifier and the second network identifier. The authentication server 405 may generate the first set of network zones based on the first assurance score associated with the first network identifier and on the second assurance score associated with the second network identifier each satisfying a first threshold. In some examples, the authentication server 405 may receive, via one or more user inputs, an indication of a second set of network zones prior to receiving the first device access signal and the second device access signal. Thus, the second set of network zones may be updated based on monitoring the first device access signal and the second device access signal and the ML model 410 generating the first set of network zones.

In some cases, the authentication server 405 may also store, at a multi-tenant database of the muti-tenant system, a second set of data including the first network identifier, the first assurance score associated with the first network identifier, the second network identifier, the second assurance score associated with the second network identifier, or any combination thereof. The multi-tenant database may further include the first set of data associated with the one or more tenants of the multi-tenant system. Moreover, the authentication server 405 may generate first set of network zones based on storing the second set of data within the multi-tenant database. Further, storing data in the multi-tenant database of the multi-tenant system may include updating data within the multi-tenant database.

In some examples, the authentication server 405 may further transmit, to a third user 185 associated with a tenant of the multi-tenant system, an indication of the first set of network zones generated via the ML model 410 and a recommendation to establish the first set of network zones. Moreover, in some cases, a respective network zone of the first set of network zone may provide one or more users 185 access or may restrict one or more users 185 access to a network associated with a tenant, one or more applications 110 or services associated with the tenant, or a combination thereof while the one or more users are within the respective network zone. Therefore, based on the authentication server 405 transmitting the recommendation to the third user, the authentication server 405 may receive, via a user input from the third user 185, an indication to establish the first set of network zones or an indication to refuse to establish the first set of network zones.

Figure 6:
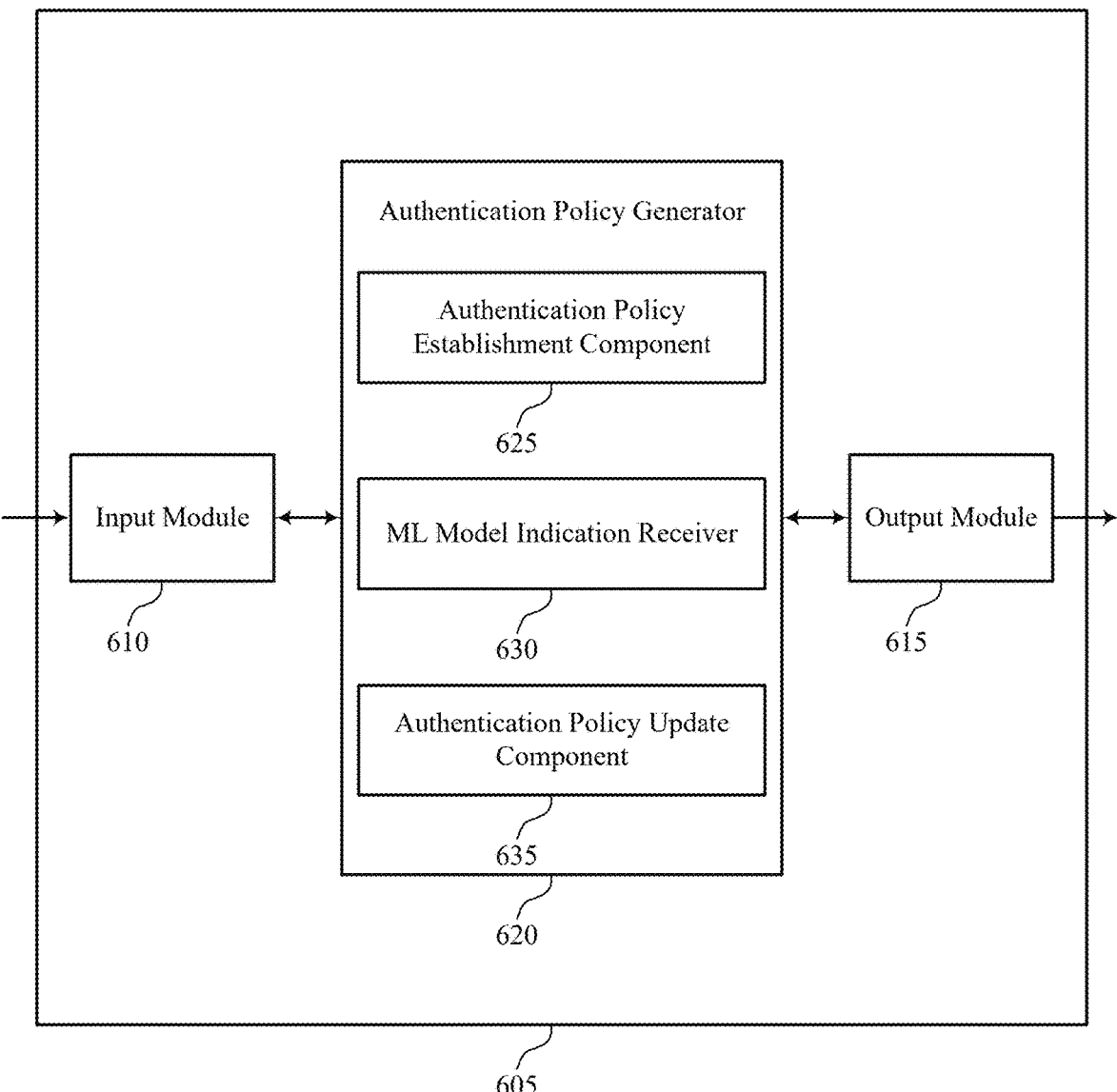
FIG. 6 shows a block diagram of an apparatus that supports dynamic policy and network security zone generation in accordance with aspects of the present disclosure.

FIG. 6 shows a block diagram 600 of a device 605 that supports dynamic policy and network security zone generation in accordance with aspects of the present disclosure. The device 605 may include an input module 610, an output module 615, and an authentication policy generator 620. The device 605, or one or more components of the device 605 (e.g., the input module 610, the output module 615, the authentication policy generator 620), may include at least one processor, which may be coupled with at least one memory, to support the described techniques. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the authentication policy generator 620 to support dynamic policy and network security zone generation. In some cases, the input module 610 may be a component of an input/output (I/O) controller 810 as described with reference to FIG. 8.

The output module 615 may manage output signals for the device 605. For example, the output module 615 may receive signals from other components of the device 605, such as the authentication policy generator 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the authentication policy generator 620 may include an authentication policy establishment component 625, an ML model indication receiver 630, an authentication policy update component 635, or any combination thereof. In some examples, the authentication policy generator 620, or various components thereof, may be configured to perform various operations (e.g., receiving, monitoring, transmitting) using or otherwise in cooperation with the input module 610, the output module 615, or both. For example, the authentication policy generator 620 may receive information from the input module 610, send information to the output module 615, or be integrated in combination with the input module 610, the output module 615, or both to receive information, transmit information, or perform various other operations as described herein.

The authentication policy generator 620 may support authentication policy management in accordance with examples as disclosed herein. The authentication policy establishment component 625 may be configured to support establishing an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications. The ML model indication receiver 630 may be configured to support receiving, from a machine learning model, an indication to update the authentication policy of the first tenant based on a second set of authentication rules associated with one or more second tenants of the multitenant authentication platform, the second set of authentication rules being associated with one or more applications of the set of multiple applications that are common to the first tenant and the one or more second tenants. The authentication policy update component 635 may be configured to support updating the authentication policy of the first tenant based on receiving the indication from the machine learning model.

Figure 7:
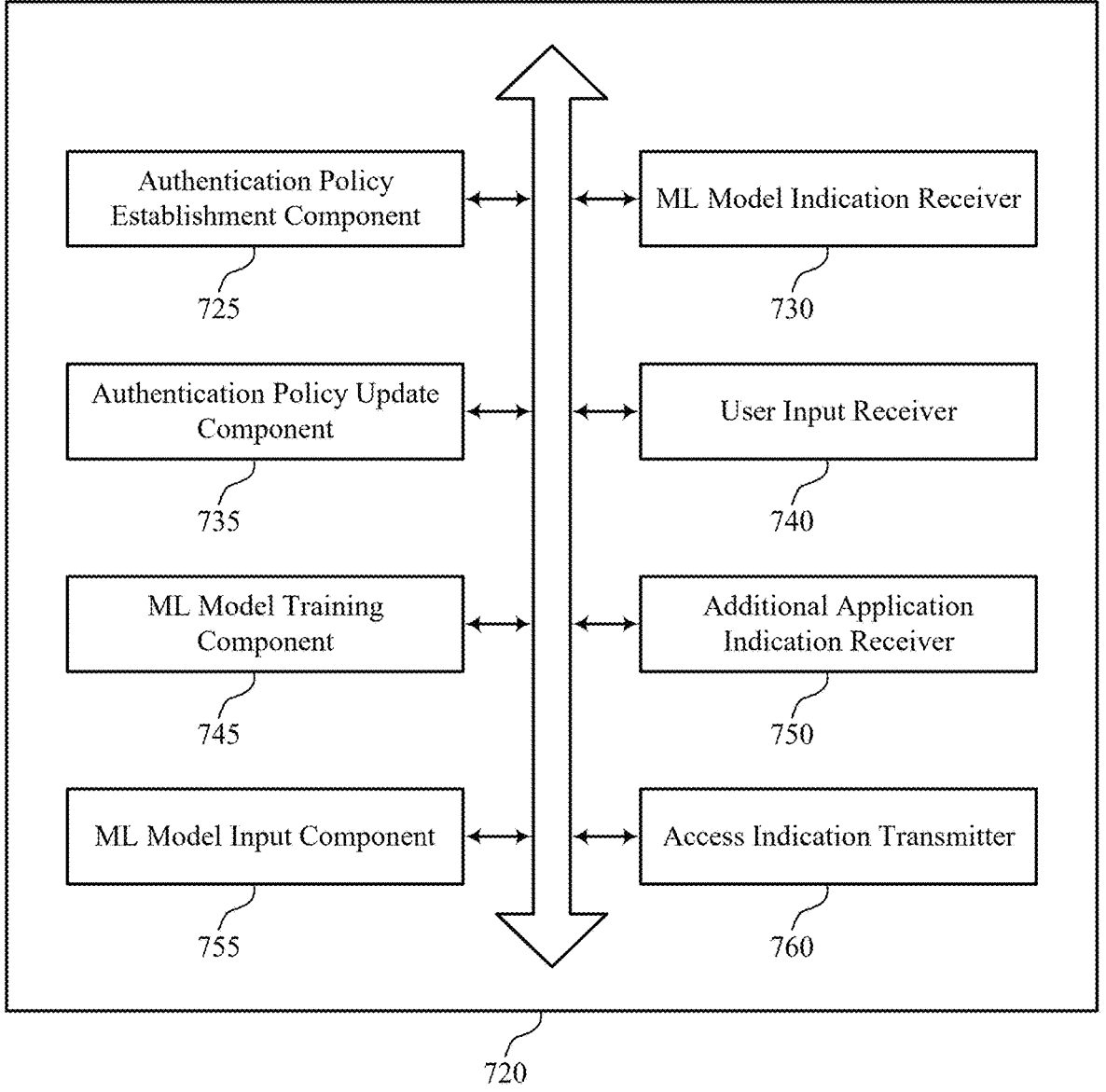
FIG. 7 shows a block diagram of an authentication policy generator that supports dynamic policy and network security zone generation in accordance with aspects of the present disclosure.

FIG. 7 shows a block diagram 700 of an authentication policy generator 720 that supports dynamic policy and network security zone generation in accordance with aspects of the present disclosure. The authentication policy generator 720 may be an example of aspects of an authentication policy generator or an authentication policy generator 620, or both, as described herein. The authentication policy generator 720, or various components thereof, may be an example of means for performing various aspects of dynamic policy and network security zone generation as described herein. For example, the authentication policy generator 720 may include an authentication policy establishment component 725, an ML model indication receiver 730, an authentication policy update component 735, a user input receiver 740, an ML model training component 745, an additional application indication receiver 750, an ML model input component 755, an access indication transmitter 760, or any combination thereof. Each of these components, or components of subcomponents thereof (e.g., one or more processors, one or more memories), may communicate, directly or indirectly, with one another (e.g., via one or more buses).

The authentication policy generator 720 may support authentication policy management in accordance with examples as disclosed herein. The authentication policy establishment component 725 may be configured to support establishing an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications. The ML model indication receiver 730 may be configured to support receiving, from a machine learning model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants. The authentication policy update component 735 may be configured to support updating the authentication policy of the first tenant based on receiving the indication from the machine learning model.

In some examples, the user input receiver 740 may be configured to support receiving, via one or more user inputs for a first user associated with the first tenant, an indication of one or more authentication rules associated with access to the one or more applications of the set of multiple applications, the first set of authentication rules including the one or more authentication rules, where establishing the authentication policy for the first tenant is based on receiving the one or more user inputs.

In some examples, to support establishing the authentication policy for the first tenant, the authentication policy establishment component 725 may be configured to support generating, via the machine learning model, the first set of authentication rules for the authentication policy of the first tenant based on one or more authentication rules used by the one or more second tenants of the multi-tenant authentication platform that are associated with accessing the one or more applications of the set of multiple applications, where the first set of authentication rules are generated via the machine learning model in accordance with a privacy preservation scheme.

In some examples, the ML model training component 745 may be configured to support training the machine learning model using a first set of data associated with a type of application for each application of the one or more applications, a second set of data associated with user metadata of one or more sets of users of each tenant of the multi-tenant authentication platform, a third set of data associated with a set of user device data of one or more user devices being used by the one or more sets of users, a fourth set of data associated with network conditions of an access request, or any combination thereof.

In some examples, the type of application for a respective application indicated by the first set of data is based on the respective application being associated with sensitive data of a respective tenant.

In some examples, the additional application indication receiver 750 may be configured to support receiving, from a user of the first tenant, an indication of an additional application to be accessed by the users associated with the first tenant, where the indication to update the authentication policy of the first tenant is received from the machine learning model based on the user of the first tenant adding the additional application to the set of multiple applications being accessed by the users of the first tenant, a first set of attributes associated with the user of the first tenant, a second set of attributes associated with a device used by the first user to access the additional application, or any combination thereof, and where the second set of authentication rules associated with the one or more second tenants are associated with the additional application, a third set of attributes associated with a set of users of the one or more second tenants, a fourth set of attributes associated with a set of devices used by the set of users to access the additional application, or any combination thereof.

In some examples, to support receiving the indication from the machine learning model, the ML model indication receiver 730 may be configured to support receiving, from the machine learning model, an indication that the second set of authentication rules satisfy a first threshold for accessing the one or more applications, the first threshold being based on a first quantity of successful access requests and a second quantity of unsuccessful access requests.

In some examples, the user input receiver 740 may be configured to support receiving, from one or more users associated with one or more respective tenants, one or more access request messages to access a respective application, the one or more access request messages including data associated with the one or more users. In some examples, the access indication transmitter 760 may be configured to support transmitting, to the one or more users, a second indication to indicate a successful access request or an unsuccessful access request based on the data associated with the one or more users of the one or more access request messages, where the data associated with the one or more users indicates an affiliation of a user with a respective tenant and the first threshold for a respective authentication rule is satisfied based on the first quantity of successful access requests that are associated with an unaffiliated user satisfying a second threshold and the second quantity of unsuccessful access requests that are associated with an unaffiliated user satisfying a third threshold.

In some examples, the user input receiver 740 may be configured to support receiving, from one or more users associated with each tenant, one or more access request messages including a first set of attributes associated with the one or more users and a second set of attributes associated with one or more devices used by the one or more users. In some examples, the ML model input component 755 may be configured to support inputting the one or more access request messages into the machine learning model, where the indication from the machine learning model is based on the one or more access request messages that are input into the machine learning model.

In some examples, updating the authentication policy of the first tenant is automatically triggered based on receiving the indication from the machine learning model.

Figure 8:
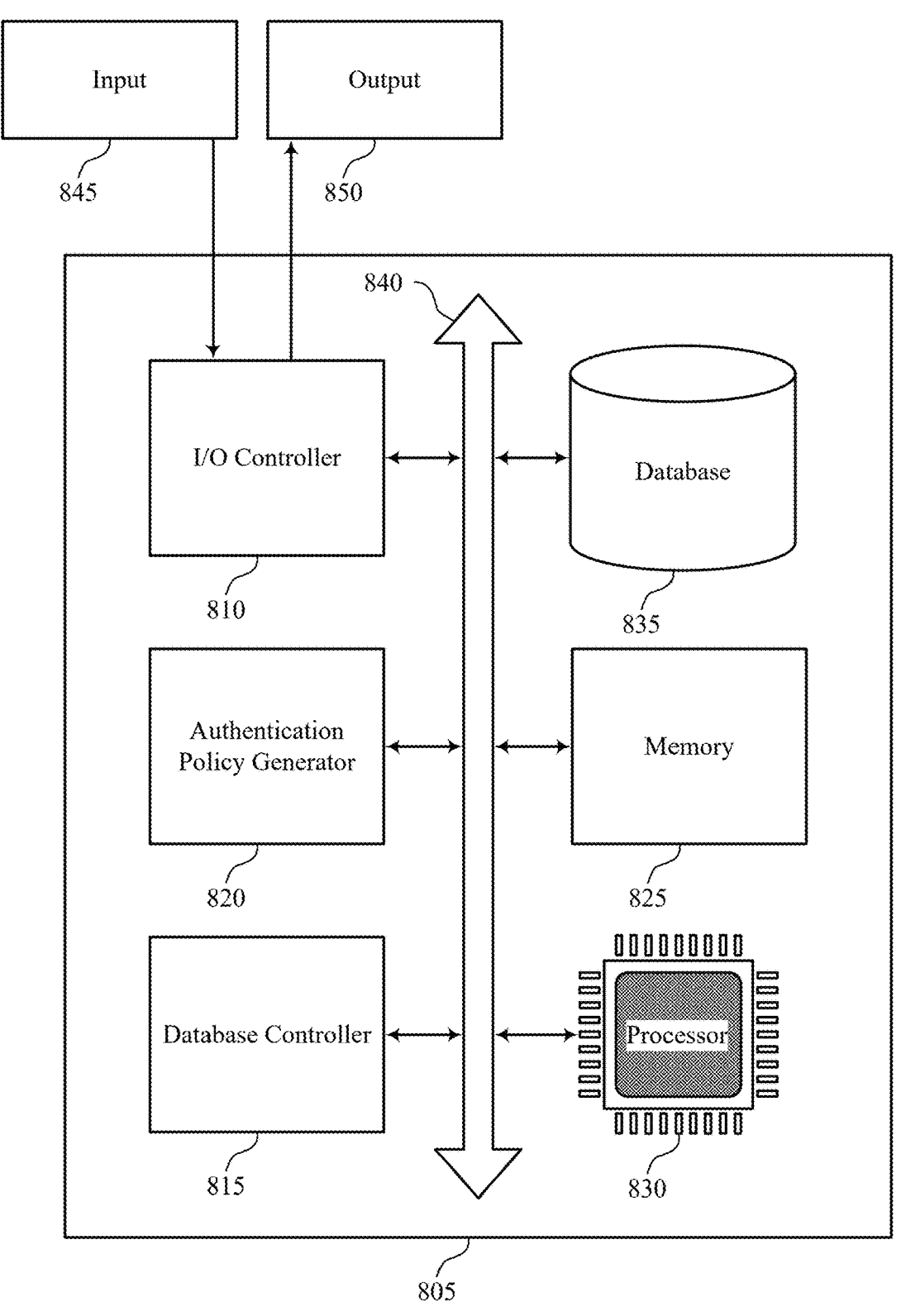
FIG. 8 shows a diagram of a system including a device that supports dynamic policy and network security zone generation in accordance with aspects of the present disclosure.

FIG. 8 shows a diagram of a system 800 including a device 805 that supports dynamic policy and network security zone generation in accordance with aspects of the present disclosure. The device 805 may be an example of or include components of a device 605 as described herein. The device 805 may include components for bi-directional voice and data communications including components for transmitting and receiving communications, such as an authentication policy generator 820, an I/O controller, such as an I/O controller 810, a database controller 815, at least one memory 825, at least one processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause at least one processor 830 to perform various functions described herein. In some cases, the memory 825 may contain, among other things, a basic I/O system (BIOS) which may control basic hardware or software operation such as the interaction with peripheral components or devices. The memory 825 may be an example of a single memory or multiple memories. For example, the device 805 may include one or more memories 825.

The processor 830 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in at least one memory 825 to perform various functions (e.g., functions or tasks supporting dynamic policy and network security zone generation). The processor 830 may be an example of a single processor or multiple processors. For example, the device 805 may include one or more processors 830.

The authentication policy generator 820 may support authentication policy management in accordance with examples as disclosed herein. For example, the authentication policy generator 820 may be configured to support establishing an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications. The authentication policy generator 820 may be configured to support receiving, from a machine learning model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants. The authentication policy generator 820 may be configured to support updating the authentication policy of the first tenant based on receiving the indication from the machine learning model.

By including or configuring the authentication policy generator 820 in accordance with examples as described herein, the device 805 may support techniques for an authentication server to automatically generate or update authentication policies and network zones for users to support increased security of applications, improved authentication procedures, improved communication reliability, reduced latency, improved user experience, and improved coordination between devices.

Figure 9:
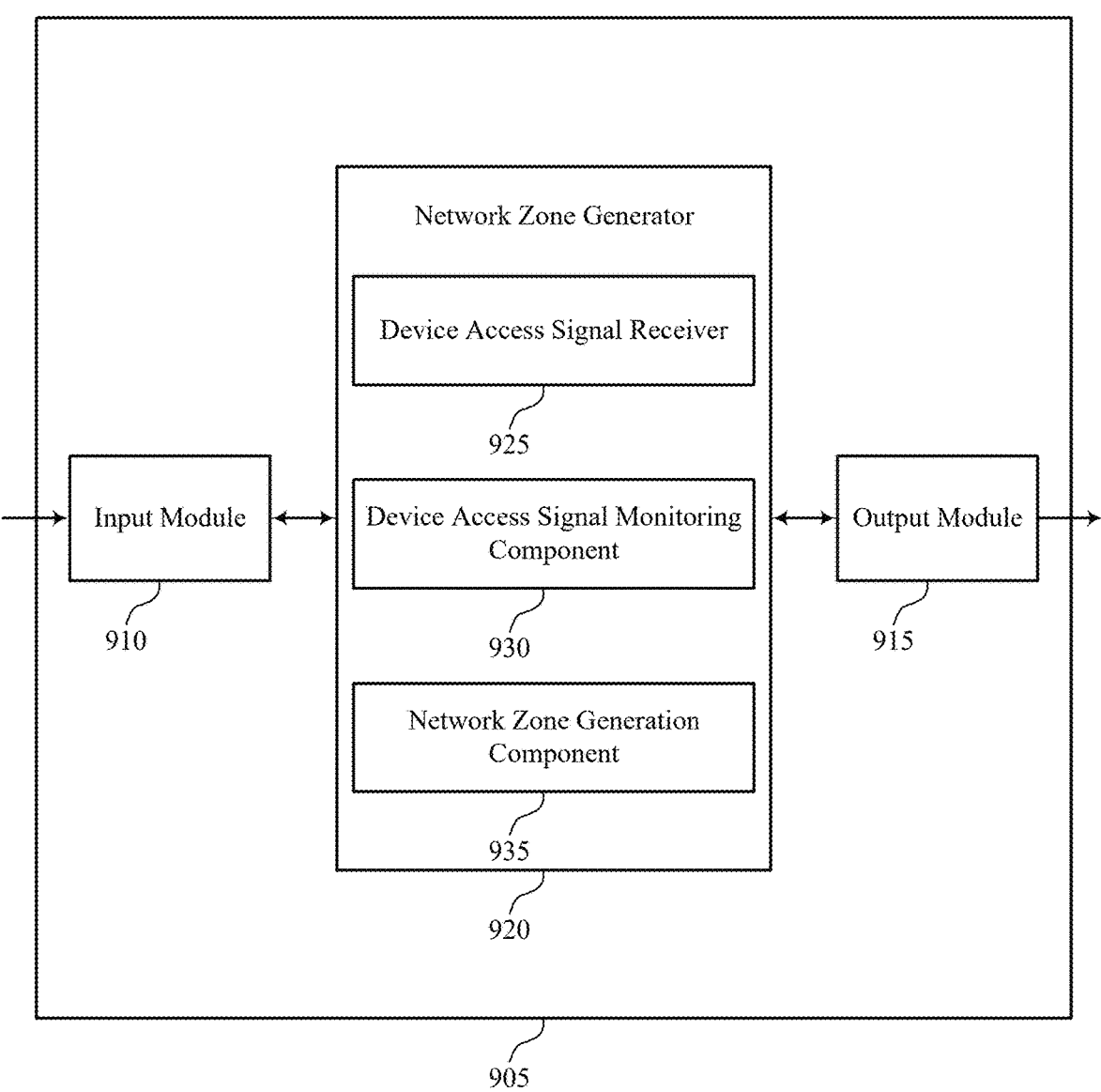
FIG. 9 shows a block diagram of an apparatus that supports dynamic policy and network security zone generation in accordance with aspects of the present disclosure.

FIG. 9 shows a block diagram 900 of a device 905 that supports dynamic policy and network security zone generation in accordance with aspects of the present disclosure. The device 905 may include an input module 910, an output module 915, and a network zone generator 920. The device 905, or one or more components of the device 905 (e.g., the input module 910, the output module 915, the network zone generator 920), may include at least one processor, which may be coupled with at least one memory, to support the described techniques. Each of these components may be in communication with one another (e.g., via one or more buses).

The input module 910 may manage input signals for the device 905. For example, the input module 910 may identify input signals based on an interaction with a modem, a keyboard, a mouse, a touchscreen, or a similar device. These input signals may be associated with user input or processing at other components or devices. In some cases, the input module 910 may utilize an operating system such as iOS®, ANDROID®, MS-DOS®, MS-WINDOWS®, OS/2®, UNIX®, LINUX®, or another known operating system to handle input signals. The input module 910 may send aspects of these input signals to other components of the device 905 for processing. For example, the input module 910 may transmit input signals to the network zone generator 920 to support dynamic policy and network security zone generation. In some cases, the input module 910 may be a component of an input/output (I/O) controller 1110 as described with reference to FIG. 11.

The output module 915 may manage output signals for the device 905. For example, the output module 915 may receive signals from other components of the device 905, such as the network zone generator 920, and may transmit these signals to other components or devices. In some examples, the output module 915 may transmit output signals for display in a user interface, for storage in a database or data store, for further processing at a server or server cluster, or for any other processes at any number of devices or systems. In some cases, the output module 915 may be a component of an I/O controller 1110 as described with reference to FIG. 11.

For example, the network zone generator 920 may include a device access signal receiver 925, a device access signal monitoring component 930, a network zone generation component 935, or any combination thereof. In some examples, the network zone generator 920, or various components thereof, may be configured to perform various operations (e.g., receiving, monitoring, transmitting) using or otherwise in cooperation with the input module 910, the output module 915, or both. For example, the network zone generator 920 may receive information from the input module 910, send information to the output module 915, or be integrated in combination with the input module 910, the output module 915, or both to receive information, transmit information, or perform various other operations as described herein.

The network zone generator 920 may support network zone management in accordance with examples as disclosed herein. The device access signal receiver 925 may be configured to support receiving, from a first device associated with a first user, a first device access signal associated with a first network identifier that corresponds to the first device. The device access signal receiver 925 may be configured to support receiving, from a second device associated with a second user, a second device access signal associated with a second network identifier that corresponds to the second device. The device access signal monitoring component 930 may be configured to support monitoring, via a machine learning model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system. The network zone generation component 935 may be configured to support generating, for a first tenant of the multi-tenant system via the machine learning model, a first set of network zones including the first network identifier and the second network identifier based on the first assurance score associated with the first network identifier and the second assurance score associated with the second network identifier each satisfying a first threshold.

Figure 10:
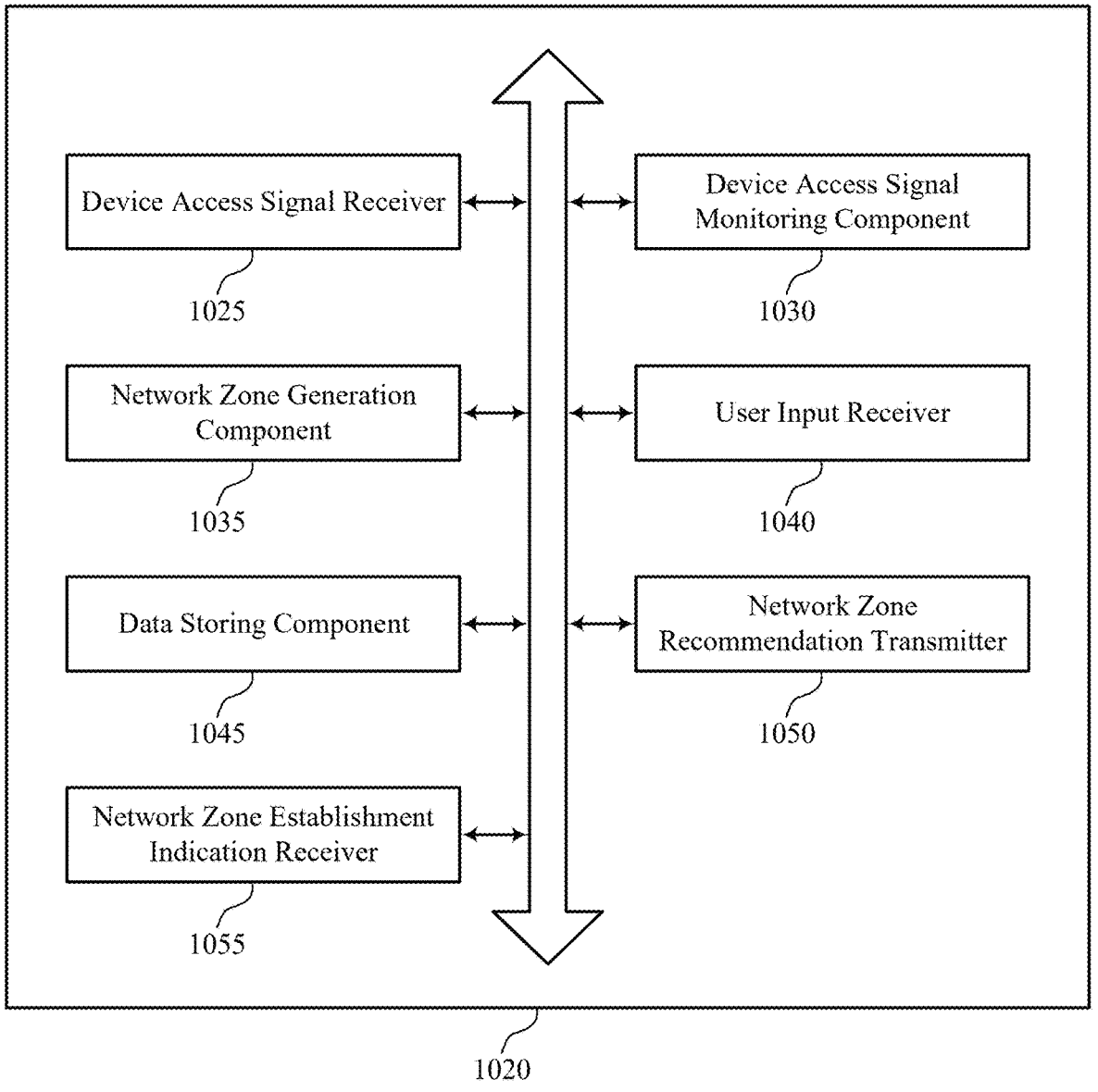
FIG. 10 shows a block diagram of a network zone generator that supports dynamic policy and network security zone generation in accordance with aspects of the present disclosure.

FIG. 10 shows a block diagram 1000 of a network zone generator 1020 that supports dynamic policy and network security zone generation in accordance with aspects of the present disclosure. The network zone generator 1020 may be an example of aspects of a network zone generator or a network zone generator 920, or both, as described herein. The network zone generator 1020, or various components thereof, may be an example of means for performing various aspects of dynamic policy and network security zone generation as described herein. For example, the network zone generator 1020 may include a device access signal receiver 1025, a device access signal monitoring component 1030, a network zone generation component 1035, a user input receiver 1040, a data storing component 1045, a network zone recommendation transmitter 1050, a network zone establishment indication receiver 1055, or any combination thereof. Each of these components, or components of sub-components thereof (e.g., one or more processors, one or more memories), may communicate, directly or indirectly, with one another (e.g., via one or more buses).

The network zone generator 1020 may support network zone management in accordance with examples as disclosed herein. The device access signal receiver 1025 may be configured to support receiving, from a first device associated with a first user, a first device access signal associated with a first network identifier that corresponds to the first device. In some examples, the device access signal receiver 1025 may be configured to support receiving, from a second device associated with a second user, a second device access signal associated with a second network identifier that corresponds to the second device. The device access signal monitoring component 1030 may be configured to support monitoring, via a machine learning model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system. The network zone generation component 1035 may be configured to support generating, for a first tenant of the multi-tenant system via the machine learning model, a first set of network zones including the first network identifier and the second network identifier based on the first assurance score associated with the first network identifier and the second assurance score associated with the second network identifier each satisfying a first threshold.

In some examples, the user input receiver 1040 may be configured to support receiving, via one or more user inputs, an indication of a second set of network zones prior to receiving the first device access signal and the second device access signal, where the second set of network zones are updated based on monitoring the first device access signal and the second device access signal.

In some examples, the data storing component 1045 may be configured to support storing, at a multi-tenant database of the multi-tenant system, a second set of data including the first network identifier, the first assurance score associated with the first network identifier, the second network identifier, the second assurance score associated with the second network identifier, or any combination thereof, the multi-tenant database including the first set of data associated with the one or more tenants of the multi-tenant system, where the first set of network zones are generated based on storing the second set of data within the multi-tenant database, where storing data in the multi-tenant database of the multi-tenant system includes updating data within the multi-tenant database.

In some examples, the network zone recommendation transmitter 1050 may be configured to support transmitting, to a third user associated with a tenant of the multi-tenant system, an indication of the first set of network zones generated and a recommendation to establish the first set of network zones. In some examples, the network zone establishment indication receiver 1055 may be configured to support receiving, via a user input from the third user, an indication to establish the first set of network zones or an indication to refuse establishing the first set of network zones, the indication being based on the recommendation being transmitted to the third user.

In some examples, the first device access signal includes data associated with the first device and the first user, and the second device access signal includes data associated with the second device and the second user and, to support monitoring the first device access signal and the second device access signal, the device access signal monitoring component 1030 may be configured to support monitoring, via the machine learning model, the data of a respective device access signal to obtain a respective assurance score for a respective network identifier associated the respective device access signal.

In some examples, the first device access signal, the second device access signal, or both are associated with a phishing-resistant platform, data that is associated with a respective tenant of the multi-tenant system, a network identifier that is associated with the respective tenant, a respective device that is managed by the respective tenant, or any combination thereof.

In some examples, a respective network identifier of a respective device access signal includes an internet protocol address, a geographical location, or both.

In some examples, a respective network zone of the first set of network zones provides one or more users access or restricts one or more users access to a network associated with a tenant, one or more applications associated with the tenant, or a combination thereof while the one or more users are within the respective network zone.

In some examples, the first device access signal indicates a first set of data associated with the first device and the first user and the second device access signal indicates a second set of data associated with the second device and the second user.

Figure 11:
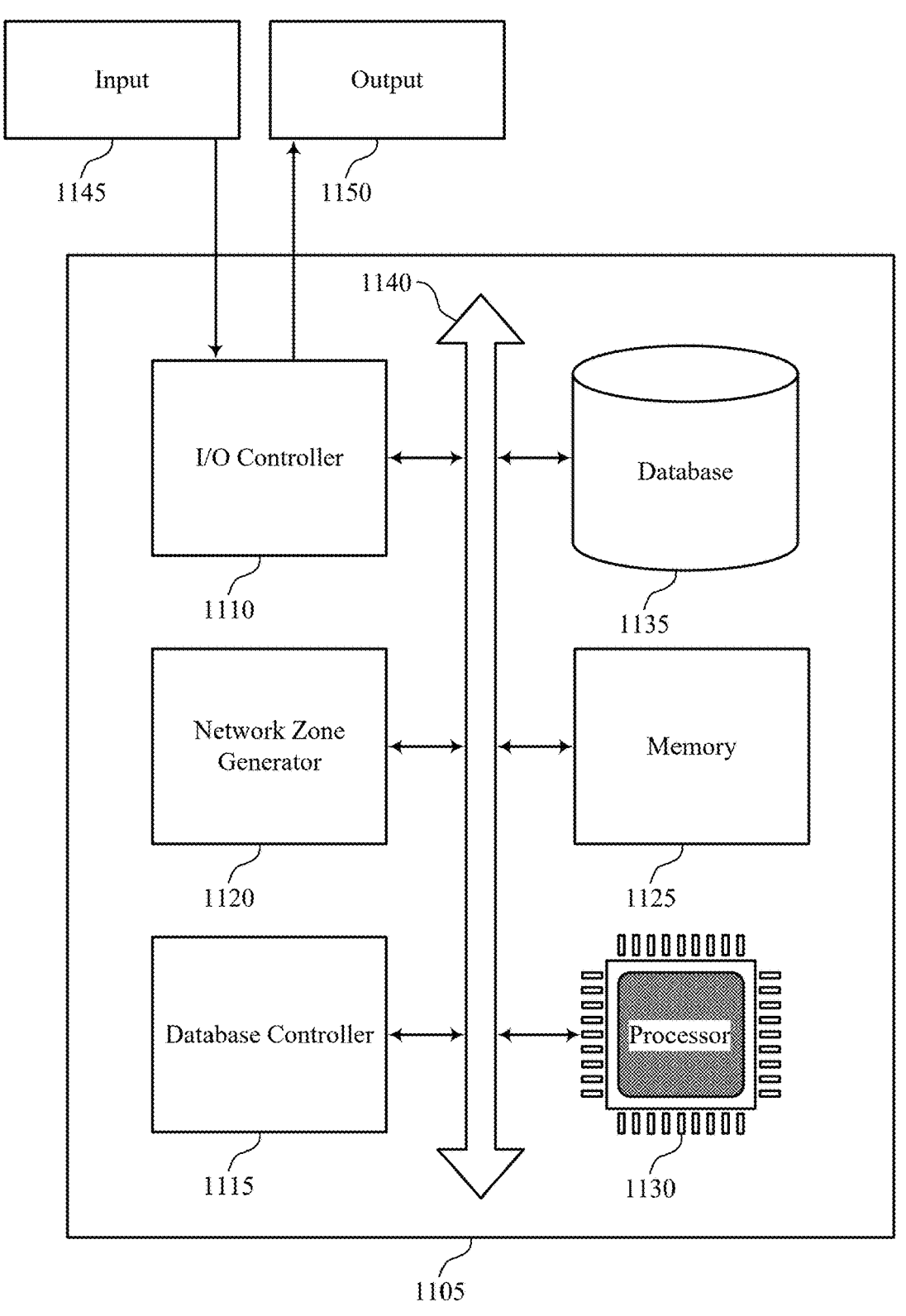
FIG. 11 shows a diagram of a system including a device that supports dynamic policy and network security zone generation in accordance with aspects of the present disclosure.

FIG. 11 shows a diagram of a system 1100 including a device 1105 that supports dynamic policy and network security zone generation in accordance with aspects of the present disclosure. The device 1105 may be an example of or include components of a device 905 as described herein. The device 1105 may include components for bi-directional voice and data communications including components for transmitting and receiving communications, such as a network zone generator 1120, an I/O controller, such as an I/O controller 1110, a database controller 1115, at least one memory 1125, at least one processor 1130, and a database 1135. These components may be in electronic communication or otherwise coupled (e.g., operatively, communicatively, functionally, electronically, electrically) via one or more buses (e.g., a bus 1140).

The I/O controller 1110 may manage input signals 1145 and output signals 1150 for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. In other cases, the I/O controller 1110 may represent or interact with a modem, a keyboard, a mouse, a touchscreen, or a similar device. In some cases, the I/O controller 1110 may be implemented as part of a processor 1130. In some examples, a user may interact with the device 1105 via the I/O controller 1110 or via hardware components controlled by the I/O controller 1110.

The database controller 1115 may manage data storage and processing in a database 1135. In some cases, a user may interact with the database controller 1115. In other cases, the database controller 1115 may operate automatically without user interaction. The database 1135 may be an example of a single database, a distributed database, multiple distributed databases, a data store, a data lake, or an emergency backup database.

Memory 1125 may include random-access memory (RAM) and read-only memory (ROM). The memory 1125 may store computer-readable, computer-executable software including instructions that, when executed, cause at least one processor 1130 to perform various functions described herein. In some cases, the memory 1125 may contain, among other things, a basic I/O system (BIOS) which may control basic hardware or software operation such as the interaction with peripheral components or devices. The memory 1125 may be an example of a single memory or multiple memories. For example, the device 1105 may include one or more memories 1125.

The processor 1130 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 1130 may be configured to operate a memory array using a memory controller. In other cases, a memory controller may be integrated into the processor 1130. The processor 1130 may be configured to execute computer-readable instructions stored in at least one memory 1125 to perform various functions (e.g., functions or tasks supporting dynamic policy and network security zone generation). The processor 1130 may be an example of a single processor or multiple processors. For example, the device 1105 may include one or more processors 1130.

The network zone generator 1120 may support network zone management in accordance with examples as disclosed herein. For example, the network zone generator 1120 may be configured to support receiving, from a first device associated with a first user, a first device access signal associated with a first network identifier that corresponds to the first device. The network zone generator 1120 may be configured to support receiving, from a second device associated with a second user, a second device access signal associated with a second network identifier that corresponds to the second device. The network zone generator 1120 may be configured to support monitoring, via a machine learning model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system. The network zone generator 1120 may be configured to support generating, for a first tenant of the multi-tenant system via the machine learning model, a first set of network zones including the first network identifier and the second network identifier based on the first assurance score associated with the first network identifier and the second assurance score associated with the second network identifier each satisfying a first threshold.

By including or configuring the network zone generator 1120 in accordance with examples as described herein, the device 1105 may support techniques for an authentication server to automatically generate or update authentication policies and network zones for users to support increased security of applications, improved authentication procedures, improved communication reliability, reduced latency, improved user experience, and improved coordination between devices.

FIG. 12 shows a flowchart illustrating a method 1200 that supports dynamic policy and network security zone generation in accordance with aspects of the present disclosure. The operations of the method 1200 may be implemented by an authentication policy manager or its components as described herein. For example, the operations of the method 1200 may be performed by an authentication policy manager as described with reference to FIGS. 1 through 8. In some examples, an authentication policy manager may execute a set of instructions to control the functional elements of the authentication policy manager to perform the described functions. Additionally, or alternatively, the authentication policy manager may perform aspects of the described functions using special-purpose hardware.

At 1205, the method may include establishing an authentication policy for a first tenant of a multi-tenant authentication platform, the authentication policy being associated with a set of multiple applications associated with the first tenant, where the authentication policy indicates a first set of authentication rules for users associated with the first tenant to access the set of multiple applications. The operations of 1205 may be performed in accordance with examples as disclosed herein. In some examples, aspects of the operations of 1205 may be performed by an authentication policy establishment component 725 as described with reference to FIG. 7.

At 1210, the method may include receiving, from a machine learning model, an indication to update the authentication policy of the first tenant based on a second set of authentication rules associated with one or more second tenants of the multi-tenant authentication platform, the second set of authentication rules being associated with one or more applications of the set of multiple applications that are common to the first tenant and the one or more second tenants. The operations of 1210 may be performed in accordance with examples as disclosed herein. In some examples, aspects of the operations of 1210 may be performed by an ML model indication receiver 730 as described with reference to FIG. 7.

At 1215, the method may include updating the authentication policy of the first tenant based on receiving the indication from the machine learning model. The operations of 1215 may be performed in accordance with examples as disclosed herein. In some examples, aspects of the operations of 1215 may be performed by an authentication policy update component 735 as described with reference to FIG. 7.

FIG. 13 shows a flowchart illustrating a method 1300 that supports dynamic policy and network security zone generation in accordance with aspects of the present disclosure. The operations of the method 1300 may be implemented by a network zone manager or its components as described herein. For example, the operations of the method 1300 may be performed by a network zone manager as described with reference to FIGS. 1 through 5 and 9 through 11. In some examples, a network zone manager may execute a set of instructions to control the functional elements of the network zone manager to perform the described functions. Additionally, or alternatively, the network zone manager may perform aspects of the described functions using special-purpose hardware.

At 1305, the method may include receiving, from a first device associated with a first user, a first device access signal associated with a first network identifier that corresponds to the first device. The operations of 1305 may be performed in accordance with examples as disclosed herein. In some examples, aspects of the operations of 1305 may be performed by a device access signal receiver 1025 as described with reference to FIG. 10.

At 1310, the method may include receiving, from a second device associated with a second user, a second device access signal associated with a second network identifier that corresponds to the second device. The operations of 1310 may be performed in accordance with examples as disclosed herein. In some examples, aspects of the operations of 1310 may be performed by a device access signal receiver 1025 as described with reference to FIG. 10.

At 1315, the method may include monitoring, via a machine learning model, the first device access signal and the second device access signal to obtain a first assurance score for the first network identifier associated with the first device access signal and to obtain a second assurance score for the second network identifier associated with the second device access signal, where the first assurance score and the second assurance score are obtained based on a first set of data that is associated with one or more tenants of a multi-tenant system. The operations of 1315 may be performed in accordance with examples as disclosed herein. In some examples, aspects of the operations of 1315 may be performed by a device access signal monitoring component 1030 as described with reference to FIG. 10.

At 1320, the method may include generating, for a first tenant of the multi-tenant system via the machine learning model, a first set of network zones including the first network identifier and the second network identifier based on the first assurance score associated with the first network identifier and the second assurance score associated with the second network identifier each satisfying a first threshold. The operations of 1320 may be performed in accordance with examples as disclosed herein. In some examples, aspects of the operations of 1320 may be performed by a network zone generation component 1035 as described with reference to FIG. 10.

The following provides an overview of aspects of the present disclosure:

Aspect 1: A method for authentication policy management, comprising: establishing an authentication policy for a first tenant of a multi-tenant authentication platform, the authentication policy being associated with a plurality of applications associated with the first tenant, wherein the authentication policy indicates a first set of authentication rules for users associated with the first tenant to access the plurality of applications; receiving, from a machine learning model, an indication to update the authentication policy of the first tenant based at least in part on a second set of authentication rules associated with one or more second tenants of the multi-tenant authentication platform, the second set of authentication rules being associated with one or more applications of the plurality of applications that are common to the first tenant and the one or more second tenants; and updating the authentication policy of the first tenant based at least in part on receiving the indication from the machine learning model.

Aspect 2: The method of aspect 1, further comprising: receiving, via one or more user inputs for a first user associated with the first tenant, an indication of one or more authentication rules associated with access to the one or more applications of the plurality of applications, the first set of authentication rules comprising the one or more authentication rules, wherein establishing the authentication policy for the first tenant is based at least in part on receiving the one or more user inputs.

Aspect 3: The method of any of aspects 1 through 2 wherein establishing the authentication policy for the first tenant comprises: generating, via the machine learning model, the first set of authentication rules for the authentication policy of the first tenant based at least in part on one or more authentication rules used by the one or more second tenants of the multi-tenant authentication platform that are associated with accessing the one or more applications of the plurality of applications, wherein the first set of authentication rules are generated via the machine learning model in accordance with a privacy preservation scheme.

Aspect 4: The method of any of aspects 1 through 3, further comprising: training the machine learning model using a first set of data associated with a type of application for each application of the one or more applications, a second set of data associated with user metadata of one or more sets of users of each tenant of the multi-tenant authentication platform, a third set of data associated with a set of user device data of one or more user devices being used by the one or more sets of users, a fourth set of data associated with network conditions of an access request, or any combination thereof.

Aspect 5: The method of aspect 4, wherein the type of application for a respective application indicated by the first set of data is based at least in part on the respective application being associated with sensitive data of a respective tenant.

Aspect 6: The method of any of aspects 1 through 5, further comprising: receiving, from a user of the first tenant, an indication of an additional application to be accessed by the users associated with the first tenant, wherein the indication to update the authentication policy of the first tenant is received from the machine learning model based at least in part on the user of the first tenant adding the additional application to the plurality of applications being accessed by the users of the first tenant, a first set of attributes associated with the user of the first tenant, a second set of attributes associated with a device used by the first user to access the additional application, or any combination thereof, and wherein the second set of authentication rules associated with the one or more second tenants are associated with the additional application, a third set of attributes associated with a set of users of the one or more second tenants, a fourth set of attributes associated with a set of devices used by the set of users to access the additional application, or any combination thereof.

Aspect 7: The method of any of aspects 1 through 6, wherein receiving the indication from the machine learning model comprises: receiving, from the machine learning model, an indication that the second set of authentication rules satisfy a first threshold for accessing the one or more applications, the first threshold being based at least in part on a first quantity of successful access requests and a second quantity of unsuccessful access requests.

Aspect 8: The method of aspect 7, further comprising: receiving, from one or more users associated with one or more respective tenants, one or more access request messages to access a respective application, the one or more access request messages comprising data associated with the one or more users; and transmitting, to the one or more users, a second indication to indicate a successful access request or an unsuccessful access request based at least in part on the data associated with the one or more users of the one or more access request messages, wherein the data associated with the one or more users indicates an affiliation of a user with a respective tenant and the first threshold for a respective authentication rule is satisfied based at least in part on the first quantity of successful access requests that are associated with an unaffiliated user satisfying a second threshold and the second quantity of unsuccessful access requests that are associated with an unaffiliated user satisfying a third threshold.

Aspect 9: The method of any of aspects 1 through 8, further comprising: receiving, from one or more users associated with each tenant, one or more access request messages comprising a first set of attributes associated with the one or more users and a second set of attributes associated with one or more devices used by the one or more users; and inputting the one or more access request messages into the machine learning model, wherein the indication from the machine learning model is based at least in part on the one or more access request messages that are input into the machine learning model.

Aspect 10: The method of any of aspects 1 through 9, wherein updating the authentication policy of the first tenant is automatically triggered based at least in part on receiving the indication from the machine learning model.

Aspect 11: A method for network zone management, comprising: receiving, from a first device associated with a first user, a first device access signal associated with a first network identifier that corresponds to the first device; receiving, from a second device associated with a second user, a second device access signal associated with a second network identifier that corresponds to the second device; monitoring, via a machine learning model, the first device access signal and the second device access signal to obtain a first assurance score for the first network identifier associated with the first device access signal and to obtain a second assurance score for the second network identifier associated with the second device access signal, wherein the first assurance score and the second assurance score are obtained based at least in part on a first set of data that is associated with one or more tenants of a multi-tenant system; and generating, for a first tenant of the multi-tenant system via the machine learning model, a first set of network zones comprising the first network identifier and the second network identifier based at least in part on the first assurance score associated with the first network identifier and the second assurance score associated with the second network identifier each satisfying a first threshold.

Aspect 12: The method of aspect 11, further comprising: receiving, via one or more user inputs, an indication of a second set of network zones prior to receiving the first device access signal and the second device access signal, wherein the second set of network zones are updated based at least in part on monitoring the first device access signal and the second device access signal.

Aspect 13: The method of any of aspects 11 through 12, further comprising: storing, at a multi-tenant database of the multi-tenant system, a second set of data comprising the first network identifier, the first assurance score associated with the first network identifier, the second network identifier, the second assurance score associated with the second network identifier, or any combination thereof, the multi-tenant database comprising the first set of data associated with the one or more tenants of the multi-tenant system, wherein the first set of network zones are generated based at least in part on storing the second set of data within the multi-tenant database, wherein storing data in the multi-tenant database of the multi-tenant system comprises updating data within the multi-tenant database.

Aspect 14: The method of any of aspects 11 through 13, further comprising: transmitting, to a third user associated with a tenant of the multi-tenant system, an indication of the first set of network zones generated and a recommendation to establish the first set of network zones; and receiving, via a user input from the third user, an indication to establish the first set of network zones or an indication to refuse establishing the first set of network zones, the indication being based at least in part on the recommendation being transmitted to the third user.

Aspect 15: The method of any of aspects 11 through 14, wherein the first device access signal comprises data associated with the first device and the first user, and the second device access signal comprises data associated with the second device and the second user, and monitoring the first device access signal and the second device access signal comprises: monitoring, via the machine learning model, the data of a respective device access signal to obtain a respective assurance score for a respective network identifier associated the respective device access signal.

Aspect 16: The method of any of aspects 11 through 15, wherein the first device access signal, the second device access signal, or both are associated with a phishing-resistant platform, data that is associated with a respective tenant of the multi-tenant system, a network identifier that is associated with the respective tenant, a respective device that is managed by the respective tenant, or any combination thereof.

Aspect 17: The method of any of aspects 11 through 16, wherein a respective network identifier of a respective device access signal comprises an internet protocol address, a geographical location, or both.

Aspect 18: The method of any of aspects 11 through 17, wherein a respective network zone of the first set of network zones provides one or more users access or restricts one or more users access to a network associated with a tenant, one or more applications associated with the tenant, or a combination thereof while the one or more users are within the respective network zone.

Aspect 19: The method of any of aspects 11 through 18, wherein the first device access signal indicates a first set of data associated with the first device and the first user and the second device access signal indicates a second set of data associated with the second device and the second user.

Aspect 20: An apparatus for authentication policy management, comprising one or more memories storing processor-executable code, and one or more processors coupled with the one or more memories and individually or collectively operable to execute the code to cause the apparatus to perform a method of any of aspects 1 through 10.

Aspect 21: An apparatus for authentication policy management, comprising at least one means for performing a method of any of aspects 1 through 10.

Aspect 22: A non-transitory computer-readable medium storing code for authentication policy management, the code comprising instructions executable by one or more processors to perform a method of any of aspects 1 through 10.

Aspect 23: An apparatus for network zone management, comprising one or more memories storing processor-executable code, and one or more processors coupled with the one or more memories and individually or collectively operable to execute the code to cause the apparatus to perform a method of any of aspects 11 through 19.

Aspect 24: An apparatus for network zone management, comprising at least one means for performing a method of any of aspects 11 through 19.

Aspect 25: A non-transitory computer-readable medium storing code for network zone management, the code comprising instructions executable by one or more processors to perform a method of any of aspects 11 through 19.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations, and does not represent all the examples that may be implemented, or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by one or more processors, firmware, or any combination thereof. If implemented in software executed by one or more processors, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for authentication policy management, comprising:

establishing an authentication policy for a first tenant of a multi-tenant authentication platform, the authentication policy being associated with a plurality of applications associated with the first tenant, wherein the authentication policy indicates a first set of authentication rules for users associated with the first tenant to access the plurality of applications;

receiving, from one or more users associated with one or more respective tenants, one or more access request messages to access a respective application, the one or more access request messages comprising data associated with the one or more users, wherein the data associated with the one or more users indicates an affiliation of a user with a respective tenant;

receiving, from a machine learning model, an indication to update the authentication policy of the first tenant based at least in part on a second set of authentication rules associated with one or more second tenants of the multi-tenant authentication platform, the second set of authentication rules being associated with one or more applications of the plurality of applications that are common to the first tenant and the one or more second tenants, wherein the indication indicates that the second set of authentication rules satisfy a first threshold for accessing the one or more applications, and wherein the first threshold is based at least in part on a first quantity of successful access requests and a second quantity of unsuccessful access requests, and wherein the first threshold for a respective authentication rule is satisfied based at least in part on the first quantity of successful access requests and the second quantity of unsuccessful access requests; and updating the authentication policy of the first tenant based at least in part on receiving the indication from the machine learning model.

2. The method of claim 1, further comprising:

receiving, via one or more user inputs for a first user associated with the first tenant, an indication of one or more authentication rules associated with access to the one or more applications of the plurality of applications, the first set of authentication rules comprising the one or more authentication rules, wherein establishing the authentication policy for the first tenant is based at least in part on receiving the one or more user inputs.

3. The method of claim 1 wherein establishing the authentication policy for the first tenant comprises:

generating, via the machine learning model, the first set of authentication rules for the authentication policy of the first tenant based at least in part on one or more authentication rules used by the one or more second tenants of the multi-tenant authentication platform that are associated with accessing the one or more applications of the plurality of applications, wherein the first set of authentication rules are generated via the machine learning model in accordance with a privacy preservation scheme.

4. The method of claim 1, further comprising:

training the machine learning model using a first set of data associated with a type of application for each application of the one or more applications, a second set of data associated with user metadata of one or more sets of users of each tenant of the multi-tenant authentication platform, a third set of data associated with a set of user device data of one or more user devices being used by the one or more sets of users, a fourth set of data associated with network conditions of an access request, or any combination thereof.

5. The method of claim 4, wherein the type of application for a respective application indicated by the first set of data is based at least in part on the respective application being associated with sensitive data of a respective tenant.

6. The method of claim 1, further comprising:

receiving, from a user of the first tenant, an indication of an additional application to be accessed by the users associated with the first tenant, wherein the indication to update the authentication policy of the first tenant is received from the machine learning model based at least in part on the user of the first tenant adding the additional application to the plurality of applications being accessed by the users of the first tenant, a first set of attributes associated with the user of the first tenant, a second set of attributes associated with a device used by the user of the first tenant to access the additional application, or any combination thereof, and wherein the second set of authentication rules associated with the one or more second tenants are associated with the additional application, a third set of attributes associated with a set of users of the one or more second tenants, a fourth set of attributes associated with a set of devices used by the set of users to access the additional application, or any combination thereof.

7. The method of claim 1, further comprising:

transmitting, to the one or more users, a second indication to indicate a successful access request or an unsuccessful access request based at least in part on the data associated with the one or more users of the one or more access request messages, wherein the first threshold for the respective authentication rule is satisfied based at least in part on the first quantity of successful access requests that are associated with an unaffiliated user satisfying a second threshold and the second quantity of unsuccessful access requests that are associated with an unaffiliated user satisfying a third threshold.

8. The method of claim 1, further comprising:

receiving, from one or more users associated with each tenant and via the one or more access request messages, a first set of attributes associated with the one or more users and a second set of attributes associated with one or more devices used by the one or more users; and inputting the one or more access request messages into the machine learning model, wherein the indication from the machine learning model is based at least in part on the one or more access request messages that are input into the machine learning model.

9. The method of claim 1, wherein updating the authentication policy of the first tenant is automatically triggered based at least in part on receiving the indication from the machine learning model.

10. An apparatus for authentication policy management, comprising:

one or more memories storing processor-executable code; and one or more processors coupled with the one or more memories and individually or collectively operable to execute the code to cause the apparatus to:

establish an authentication policy for a first tenant of a multi-tenant authentication platform, the authentication policy being associated with a plurality of applications associated with the first tenant, wherein the authentication policy indicates a first set of authentication rules for users associated with the first tenant to access the plurality of applications;

receive, from one or more users associated with one or more respective tenants, one or more access request messages to access a respective application, the one or more access request messages comprising data associated with the one or more users, wherein the data associated with the one or more users indicates an affiliation of a user with a respective tenant;

receive, from a machine learning model, an indication to update the authentication policy of the first tenant based at least in part on a second set of authentication rules associated with one or more second tenants of the multi-tenant authentication platform, the second set of authentication rules being associated with one or more applications of the plurality of applications that are common to the first tenant and the one or more second tenants, wherein the indication indicates that the second set of authentication rules satisfy a first threshold for accessing the one or more applications, and wherein the first threshold is based at least in part on a first quantity of successful access requests and a second quantity of unsuccessful access requests, and wherein the first threshold for a respective authentication rule is satisfied based at least in part on the first quantity of successful access requests and the second quantity of unsuccessful access requests; and update the authentication policy of the first tenant based at least in part on receiving the indication from the machine learning model.

11. The apparatus of claim 10, wherein the one or more processors are individually or collectively further operable to execute the code to cause the apparatus to:

receive, via one or more user inputs for a first user associated with the first tenant, an indication of one or more authentication rules associated with access to the one or more applications of the plurality of applications, the first set of authentication rules comprising the one or more authentication rules, wherein establishing the authentication policy for the first tenant is based at least in part on receiving the one or more user inputs.

12. The apparatus of claim 10, wherein, to establish the authentication policy for the first tenant, the one or more processors are individually or collectively further operable to execute the code to cause the apparatus to:

generate, via the machine learning model, the first set of authentication rules for the authentication policy of the first tenant based at least in part on one or more authentication rules used by the one or more second tenants of the multi-tenant authentication platform that are associated with accessing the one or more applications of the plurality of applications, wherein the first set of authentication rules are generated via the machine learning model in accordance with a privacy preservation scheme.

13. The apparatus of claim 10, wherein the one or more processors are individually or collectively further operable to execute the code to cause the apparatus to:

training the machine learning model using a first set of data associated with a type of application for each application of the one or more applications, a second set of data associated with user metadata of one or more sets of users of each tenant of the multi-tenant authentication platform, a third set of data associated with a set of user device data of one or more user devices being used by the one or more sets of users, a fourth set of data associated with network conditions of an access request, or any combination thereof.

14. The apparatus of claim 13, wherein the type of application for a respective application indicated by the first set of data is based at least in part on the respective application being associated with sensitive data of a respective tenant.

15. The apparatus of claim 10, wherein the one or more processors are individually or collectively further operable to execute the code to cause the apparatus to:

receive, from a user of the first tenant, an indication of an additional application to be accessed by the users associated with the first tenant, wherein the indication to update the authentication policy of the first tenant is received from the machine learning model based at least in part on the user of the first tenant adding the additional application to the plurality of applications being accessed by the users of the first tenant, a first set of attributes associated with the user of the first tenant, a second set of attributes associated with a device used by the user of the first tenant to access the additional application, or any combination thereof, and wherein the second set of authentication rules associated with the one or more second tenants are associated with the additional application, a third set of attributes associated with a set of users of the one or more second tenants, a fourth set of attributes associated with a set of devices used by the set of users to access the additional application, or any combination thereof.

16. The apparatus of claim 10, wherein the one or more processors are individually or collectively further operable to execute the code to cause the apparatus to:

transmit, to the one or more users, a second indication to indicate a successful access request or an unsuccessful access request based at least in part on the data associated with the one or more users of the one or more access request messages, wherein the first threshold for the respective authentication rule is satisfied based at least in part on the first quantity of successful access requests that are associated with an unaffiliated user satisfying a second threshold and the second quantity of unsuccessful access requests that are associated with an unaffiliated user satisfying a third threshold.

17. The apparatus of claim 10, wherein the one or more processors are individually or collectively further operable to execute the code to cause the apparatus to:

receive, from one or more users associated with each tenant and via the one or more access request messages, a first set of attributes associated with the one or more users and a second set of attributes associated with one or more devices used by the one or more users; and input the one or more access request messages into the machine learning model, wherein the indication from the machine learning model is based at least in part on the one or more access request messages that are input into the machine learning model.

18. The apparatus of claim 10, wherein updating the authentication policy of the first tenant is automatically triggered based at least in part on receiving the indication from the machine learning model.

19. A non-transitory computer-readable medium storing code for authentication policy management, the code comprising instructions executable by a processor to:

establish an authentication policy for a first tenant of a multi-tenant authentication platform, the authentication policy being associated with a plurality of applications associated with the first tenant, wherein the authentication policy indicates a first set of authentication rules for users associated with the first tenant to access the plurality of applications;

receive, from one or more users associated with one or more respective tenants, one or more access request messages to access a respective application, the one or more access request messages comprising data associated with the one or more users, wherein the data associated with the one or more users indicates an affiliation of a user with a respective tenant;

receive, from a machine learning model, an indication to update the authentication policy of the first tenant based at least in part on a second set of authentication rules associated with one or more second tenants of the multi-tenant authentication platform, the second set of authentication rules being associated with one or more applications of the plurality of applications that are common to the first tenant and the one or more second tenants, wherein the indication indicates that the second set of authentication rules satisfy a first threshold for accessing the one or more applications, and wherein the first threshold is based at least in part on a first quantity of successful access requests and a second quantity of unsuccessful access requests, and wherein the first threshold for a respective authentication rule is satisfied based at least in part on the first quantity of successful access requests and the second quantity of unsuccessful access requests; and update the authentication policy of the first tenant based at least in part on receiving the indication from the machine learning model.

* * * * *